United States Patent [19]

Curry et al.

[11] Patent Number: 5,329,599
[45] Date of Patent: Jul. 12, 1994

[54] ENHANCED FIDELITY REPRODUCTION OF IMAGES BY HIERARCHICAL TEMPLATE MATCHING

[75] Inventors: Douglas N. Curry, Menlo Park; Robert P. St. John, Santa Clara; Sofia Filshtinsky, Saratoga, all of Calif.

[73] Assignee: Xerox Corporation, Stamford, Conn.

[21] Appl. No.: 146,629

[22] Filed: Oct. 29, 1993

Related U.S. Application Data

[63] Continuation of Ser. No. 811,550, Dec. 20, 1991, abandoned.

[51] Int. Cl.⁵ .......................... G06K 9/40; G09G 1/06
[52] U.S. Cl. ...................................... 382/54; 345/136; 358/447; 348/625
[58] Field of Search .................. 345/136, 137; 382/27, 382/30, 54; 358/447, 456, 458; 348/625

[56] References Cited

U.S. PATENT DOCUMENTS

| | | | |
|---|---|---|---|
| 3,573,789 | 4/1971 | Sharp et al. | 340/324 |
| 4,129,860 | 12/1978 | Yonezawa et al. | 340/728 |
| 4,437,122 | 3/1984 | Walsh et al. | 358/166 |
| 4,486,785 | 12/1984 | Lasher et al. | 340/728 |
| 4,544,922 | 10/1985 | Watanabe et al. | 340/728 |
| 4,586,037 | 4/1986 | Rosener et al. | 340/728 |
| 4,679,039 | 7/1987 | Neil et al. | 340/728 |
| 4,780,711 | 10/1988 | Doumas | 340/728 |
| 4,847,641 | 7/1989 | Tung | 346/154 |
| 4,908,780 | 3/1990 | Preim et al. | 340/728 |

FOREIGN PATENT DOCUMENTS

| | | | |
|---|---|---|---|
| 0163841 | 12/1985 | European Pat. Off. | G06K 15/12 |
| 0500375 | 8/1992 | European Pat. Off. | G06K 15/92 |

Primary Examiner—Joseph Mancuso
Assistant Examiner—David Fox
Attorney, Agent, or Firm—R. Christine Jacobs

[57] ABSTRACT

The contour fidelity of reproduction of images is enhanced by matching groups of pixels with templates based on a hierarchical set of patterns. This is accomplished by isolating a symmetrical window of pixels in the image including a central pixel and matching the groups of pixels in the window with hierarchical templates. Enhancement values for the central pixel are provided based on the results of the comparison. Windows are formed so that each pixel in the image is a central pixel for at least one window. The hierarchial set of patterns is developed so that each pattern in the hierarchy is a combination of an extension pattern and the pattern immediately below it in the hierarchy. This significantly reduces the hardware requirements for implementation of the technique. Templates are developed by creating horizontal, vertical, reversed and inverted permutations of each pattern in the set. Correctable pixel locations are identified for each template, and the central pixel receives enhancement values when it is in the correctable location of at least one template. In an microaddressable printer, overscanning and increased clock frequency provide multiple segments for representing each pixel, and spot width compensation allows multiple intensity levels for each segment.

22 Claims, 15 Drawing Sheets

ENHANCED FIDELITY REPRODUCTION OF IMAGES BY HIERARCHICAL TEMPLATE MATCHING

This is a continuation of application Ser. No. 07/811,550, filed Dec. 20, 1991, abandoned.

FIELD OF INVENTION

The present invention relates to improvement in the display of raster images, and in particular to enhancing the exposure fidelity in increased precision optical display systems. More specifically, the invention pertains to economical and technically attractive methods and means for enhancing the contour fidelity of exposures on a microaddressable optical printer.

BACKGROUND OF THE INVENTION

Others have proposed template matching techniques for more precisely controlling the size, positioning and number of picture elements ("pixels") that are printed on a xerographic photoreceptor to render bitmapped images.

Walsh et al., U.S. Pat. No. 4,437,122, describes a method of enhancing the resolution and quality of characters of a system receiving video display pixel information and providing hard copy output. The system accomplishes this by storing at least three successive lines of video data in successive parallel connected shift registers, applying the output of the shift registers to a decoder, and generating driving signals for a printer head. As described in column 2, lines 6-10, the decoder "compares the pixels on the same lines as well as in preceding and succeeding lines that surround each specific input pixel to generate the printer head driving signal according to whether straight or curved line segments are to be formed". As described in column 3, line 67, to column 4, line 1, the enhancement of the central pixel may be determined by "progressively examining an ordered table of matches to find an equivalent image and its related enhancement."

Tung, U.S. Pat. No. 4,847,641, describes a technique for enhancing the printing of bitmapped images by piecewise matching of the bitmap with predetermined stored templates of patterns to detect occurrence of preselected bitmap features. Templates representing compound error elements common to all bitmap images, associated compensation signals for each template, and the rules governing the relationships between the matched templates and the associated compensation signals are compiled into an index matching table implemented in a high speed parallel logic array.

Template matching effectively overcomes some of the sampling errors that are caused by the use of input data that is too coarse to accurately represent the higher spatial frequency content of the image. It does not, however, solve the problems that may be encountered in existing printers due to non-linearity in the way in which the spatial positioning of the transitions in printed images tracks changes in the intensity of the transitional boundary scans.

Many of the ROSs (raster output scanners) that have been developed for xerographic printing employ a single beam or a multi-beam laser light source for supplying one or more intensity modulated light beams, together with a scanner (such as polygon scanner) for cyclically deflecting the modulated laser beam or beams across a photoreceptor in a "fast scan direction" while the photoreceptor is being advanced simultaneously in an orthogonal "process direction." In practice, each of the laser beams typically is brought to focus on or near the photoreceptor surface to provide a substantially focused "scan spot." The scan spot, in turn, scans the photoreceptor in accordance with a predetermined scan pattern because the fast scan deflection of the laser beam or beams vectorially sums with the process direction motion of the photoreceptor. Indeed, the scan pattern is dependent upon and is determined by the scan rate (scan/sec) of the scanner, the spot size that is employed, and the process speed (inches/sec) of the photoreceptor. Such a scan pattern produces an exposure pattern because the scans are superpositioned on the photoreceptor, regardless of whether the scans simultaneously or sequentially expose the photoreceptor. Accordingly, it is to be understood that the present invention applies to printers and other display means that employ single beam or multi-beam ROSs, even though this disclosure features the single beam/single scan spot case for the sake of simplification.

Microaddressable printers and other types of display systems operate in an overscanned mode to render images by scanning one or more intensity modulated scan spots over a high gamma, photosensitive recording medium in accordance with a scan pattern that causes the spot or spots to superimpose multiple discrete exposures on the recording medium on centers that are separated by a pitch distance that is significantly less than the effective spatial diameter of the scan spot (i.e., the full width/half maximum (FWHM) diameter of a gaussian scan spot). Overscanned systems have substantially linear addressability responses, so boundary scans that are intensity modulated in accordance with the preselected offset values are used by these systems for spatially positioning the transitions that are contained by the images they render to a sub-pitch precision.

With older techniques of FWHM printing, the output resolution is limited to the scan resolution. With double overscanned printing, there are twice as many scans, effectively doubling the resolution scans in the process direction. The power to the laser diode, or "intensity" of each scan, can be controlled during the scan, giving subscan addressability. For example, in a printer with a spot size of 1/400 inch, scanning would take place at 800 scans per inch. At four levels of gray, the addressability of the printer increased to 3200 bits per inch.

Overscanning that results from the use of finer pitch scan patterns degrades the spatial frequency response of the printer in the process direction. A limited overscan is, however, consistent with the printing of high quality images because it permits the image transitions (i.e., the high spatial frequency content of the images) to be mapped onto the scan pattern with increased spatial precision.

The technique of microaddressability via overscanned illumination is more fully described in the copending, coassigned U.S. patent application Ser. No. 07/736,989 of D. N. Curry and D. L. Hecht, entitled "Microaddressability via overscanned Illumination for Optical Printers and the Like Having High Gamma Photosensitive Recording Media," incorporated herein by reference.

SUMMARY OF THE INVENTION

The present invention provides a method for enhancing the contour fidelity of images. The method includes isolating a window of pixels in a portion of the image and comparing pixels in the window with a hierarchical set of standard pixel patterns which include correctable pixel positions. Matching patterns are identified, and the central pixel of the window is enhanced when it lies in a correctable position in the highest priority pattern that is matched.

The present invention also provides a template matching technique with a double overscanned ROS to achieve enhanced fidelity exposures. Furthermore, the technique of the present invention may compensate for the width of a spot in both the fast scan and process directions. The technique of the present invention serves to smooth contours and jagged or stair-stepped edges commonly found in bitmapped images.

One aspect of the invention is based on the recognition of a problem with conventional and overscanned printing utilized to render enhanced exposure fidelity to a photoreceptor or other recording media. Normally the source of the high fidelity information is a sampled image or a high resolution bitmap. But many raster data sources provide low resolution bitmaps at 300 or 400 bits per inch, which is not enough resolution to eliminate unwanted artifacts induced by the coarseness of the information, such as stairstepping.

Another aspect of the invention is based on the recognition of a problem with other techniques in a conventional printer where the scan spacing is the same as the spot resolution, which does not compensate for the width of the spot. This aspect is further based on the discovery that this problem can be solved by an extension to a 2× overscanned printer, which gives the advantage of having a more linear edge positioning response with respect to intensity, thereby reducing the number of required correction intensities, as well as simplifying and making the edge positions more predictable.

The technique of the invention further compensates for the width of the spot when rendering all bitmapped data, thereby reducing distortion of shapes when the object being rendered is one or two bits wide.

The hierarchial and permutation strategy of the invention has the advantage of simplifying the implementation. Pattern templates are implemented in a hierarchial arrangement, in which the largest pattern which receives a match will have priority over smaller patterns. Patterns are arranged so that a match on any pattern in general is simply the combination of a match on the next lowest pattern plus two additional bits, saving gate resources in the decoding logic.

The following description, the drawings and the claims further set forth these and other objects, features and advantages of the invention.

DETAILED DESCRIPTION

An "image" is a pattern of light. An image may include characters, words, and text as well as other features such as graphics. An "image output device" is a device that can provide an image as output. A "display" is an image output device that provides information in visible form. The visible pattern presented by a display is an "image".

Each location in an image may be called a "pixel." In an array defining an image in which each item of data provides a value, each value indicating the color or intensity of a location may be called a "pixel value". The two-dimensional array of pixels defining the image may be "binary form" or "bitmapped," or a "gray-scale form." Each pixel value is a "bit" in the binary form or bitmap of the image, or a "gray-scale intensity value" in a gray-scale form of the image. An edge of an image may be described as a "contour" that may have a "slope" or angle.

Figure 1:
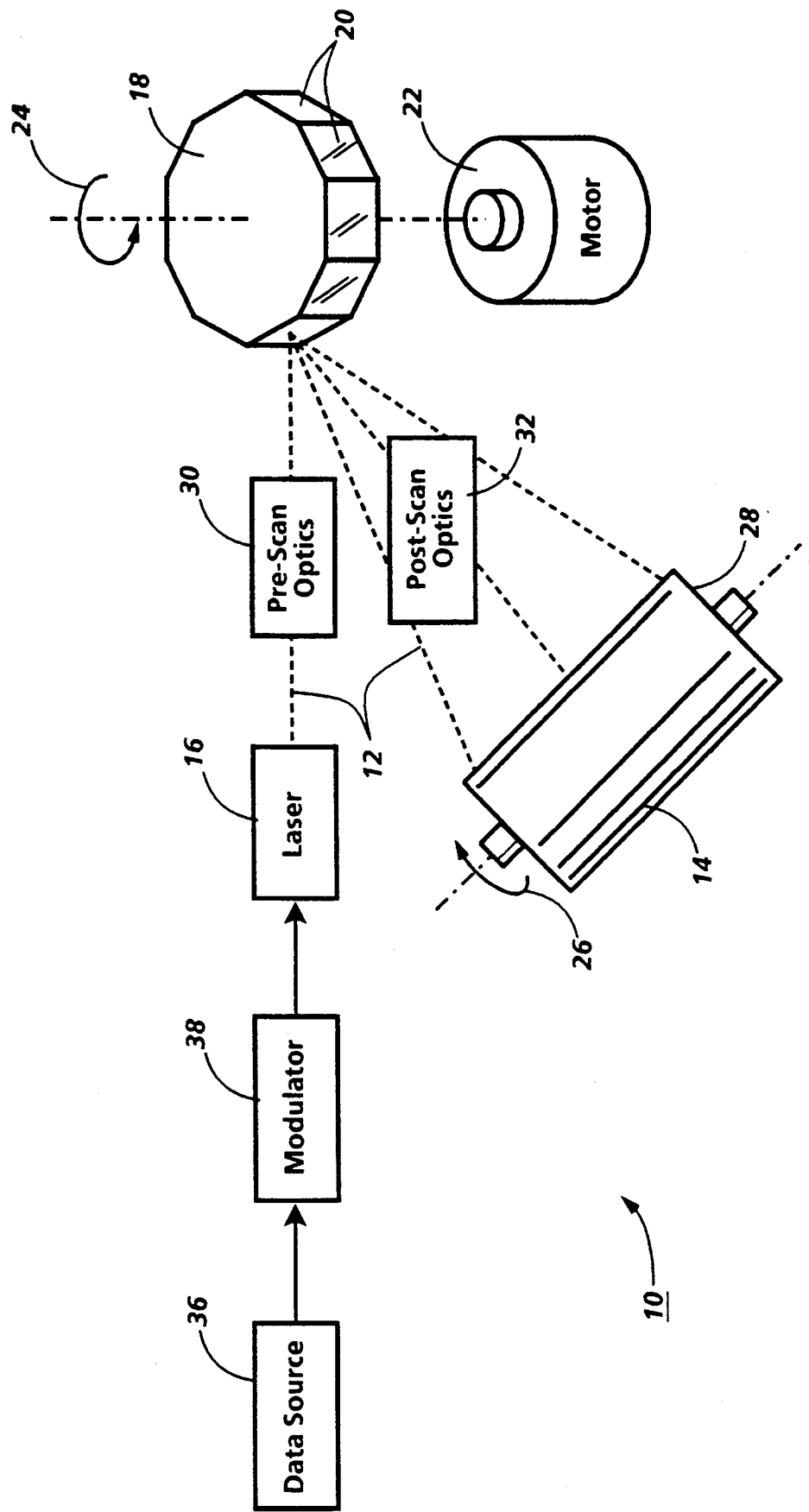
FIG. 1 shows general features of a laser printer.
Figure 2:
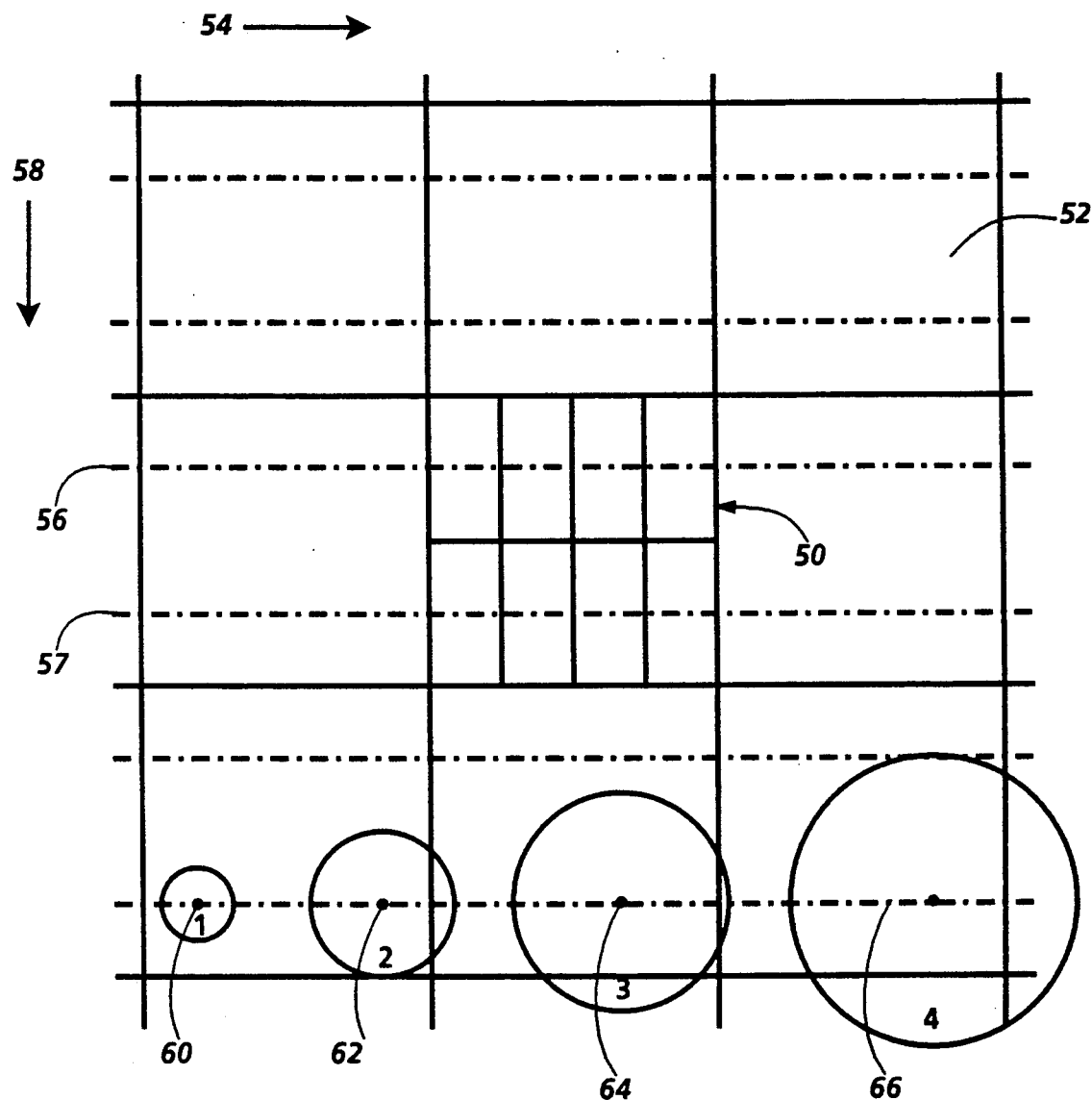
FIG. 2 shows an application of microaddressability in 2× overscanned output device to a portion of a bitmap.

FIGS. 1 and 2 show general features and application of an overscanned laser printer.

In FIG. 1, there is illustrated a more or less conventionally configured optical system 10 of a xerographic print engine (not shown). The flying spot ROS scans a data modulated light beam 12 over a xerographic photoreceptor 14 in accordance with a predetermined raster scanning pattern. To that end, the ROS comprises a laser diode 16 for emitting the light beam 12 in the visible or invisible (e.g., infrared) band of the spectrum, together with a polygon scanner 18 that has a plurality of nearly identical, mirror-like exterior sidewalls or "facets" 20.

In keeping with standard practices, there is a motor 22 for rotating the scanner 18 about its central axis, as indicated by the arrow 24, at a substantially constant angular velocity. The scanner 18 is optically aligned between the laser 16 and the photoreceptor 14, so its rotation causes the laser beam 12 to be intercepted and reflected from one after another of the scanner facets 20, with the result that the beam 12 is cyclically swept across the photoreceptor 14 in a fast scan direction. The photoreceptor 14, on the other hand, is advanced (by means not shown) simultaneously in an orthogonal, process direction at a substantially constant linear velocity, as indicated by the arrow 26, so the laser beam 12 scans the photoreceptor 14 in accordance with a raster scan pattern. As shown, the photoreceptor 14 is coated on a rotating drum 28, but it will be apparent that it also could be carried by a belt or any other suitable substrate.

Typically, the ROS additionally includes pre-scan optics 30 and post-scan optics 32 for bringing the laser beam 12 to a generally circular focus proximate the photoreceptor 14 and for providing any optical correction that may be needed to compensate for scanner wobble and other optical irregularities. Preferably, the optical aperture of the ROS is sufficiently large to avoid excessive truncation of the laser beam 12 because the beam 12 then comes to a generally circular or elliptical focus with a gaussian intensity profile. However, the broader aspects of this invention are not limited to any specific scan spot geometry or intensity profile. Accepted design principles indicate that the spatial frequency power spectrum of the scan spot profile should not have significant spatial frequency components outside the spatial frequency passband of the imaging system, but the scan spot can otherwise be tailored to satisfy a variety of system requirements.

The amplitude, duty cycle, and/or pulse width of the laser beam 12 is serially modulated (collectively referred to herein as "intensity modulation") in accordance with successive multi-bit digital data values. These data values are clocked out of a data source 36 serially in response to data clock pulses which are time synchronized with the scan of the scan spot from bit-map location-to-bitmap location within the raster scan pattern. Thus, the data clock frequency can be selected (by means not shown) to map the data onto the raster scan pattern at any desired magnification, using either the same or different magnifications in the fast scan and the process directions. The data may be preprocessed (by means not shown) for the printing of halftoned images and/or text and other types of line art, so the data source 36 generically represents any suitable source of raster data for intensity modulating the laser beam 12. The drive current for the laser diode 16 is serially modulated by modulator 38 in accordance with the data values that are clocked out of the data source 36, thereby intensity modulating the laser beam 12 at the data clock rate in accordance with those data values.

The fast scan positioning precision of the print engine 10 can be increased, if desired, by dynamically adjusting the frequency of the data clock to compensate for positioning errors that tend to be caused by "motor hunt" (i.e., variations in the angular velocity of the scanner 18), "polygon signature" characteristics (variations in the angular velocities at which the different facets 20 of the scanner 18 sweep the scan spot across the photoreceptor 14 from a start-of-scan position to an end-of-scan position), and "scan non-linearities" (i.e., localized variations in the linear velocity of the fast scan, which are caused by variances in the geometric relationship of the scanner 18 to spatially distinct segments of any given scan line).

The pitch of the scan pattern for the printer 10 is selected to be significantly finer (i.e., smaller) than the FWHM diameter of the scan spot that is formed from the scan beam 12. This relatively fine pitch scan pattern causes the printer 10 to operate in an "overscanned" mode because the FWHM central core of the scan spot sweeps across spatially overlapping segments of the photoreceptor 14 during the scanning of spatially adjacent, neighboring scan lines. Overscanning slightly degrades the spatial frequency response of the printer 10 in the process direction. However, it has been found that the linearity of the addressability response of ROS printers, such as printer 10, increases rapidly as the ratio of the scan pitch to the FWHM diameter of the scan spot is reduced to progressively smaller, sub-unity values (i.e., increasing the overscan). In other words, it has been found that overscanning is the key to providing the essentially linear position control that enables discrete exposures to map image transitions onto a scan pattern at a sub-resolution precision. Thus, in the printer shown in FIG. 1, a relatively small loss of process direction frequency response is accepted to achieve substantially increased process direction addressability.

FIG. 2 shows an example of the application of microaddressability by overscanning in a 2× overscanned output device. Central pixel 50 is surrounded by other pixels, such as pixel 52. In this case, the fast scan direction 54 is shown in a horizontal direction, and the slow scan, or process direction 58 is shown vertically. In the slow scan direction 58, scan trajectories 56 and 57 show how double scanning increases the addressability of segments of each pixel by a factor of two.

Additionally, the addressability in the slow scan direction is increased by another factor of four due to four levels of intensity adjustment in the ROS. In the fast scan direction 54, the addressability is increased by a factor of four by increasing the clock frequency. Each pixel is thereby represented by eight segments, each of which may have one of four different intensity levels. By compensating for the width of the scan spots at different intensities, the technique may reduce shape distortion when the object being rendered is one or two bits wide.

In this example, if the bitmap input were 400 bpi (bits per inch), then the enhanced printer would have 1600 addressability in the fast scan direction, and 3200 addressability in the slow scan direction. These parameters may be modified depending on target design goals.

Scan spots 60–66 show example scan spot sizes corresponding to a 2× overscanned printer, as described in copending, coassigned U.S. patent application Ser. No. 07/736,989, incorporated herein by reference. Scan spot 60 shows an example scan spot size corresponding to intensity 1. Scan spot 62 shows an example scan spot size corresponding to intensity 2. Scan spot 64 shows an example scan spot size corresponding to intensity 3. Scan spot 66 shows an example scan spot size corresponding to intensity 4.

Figure 3:
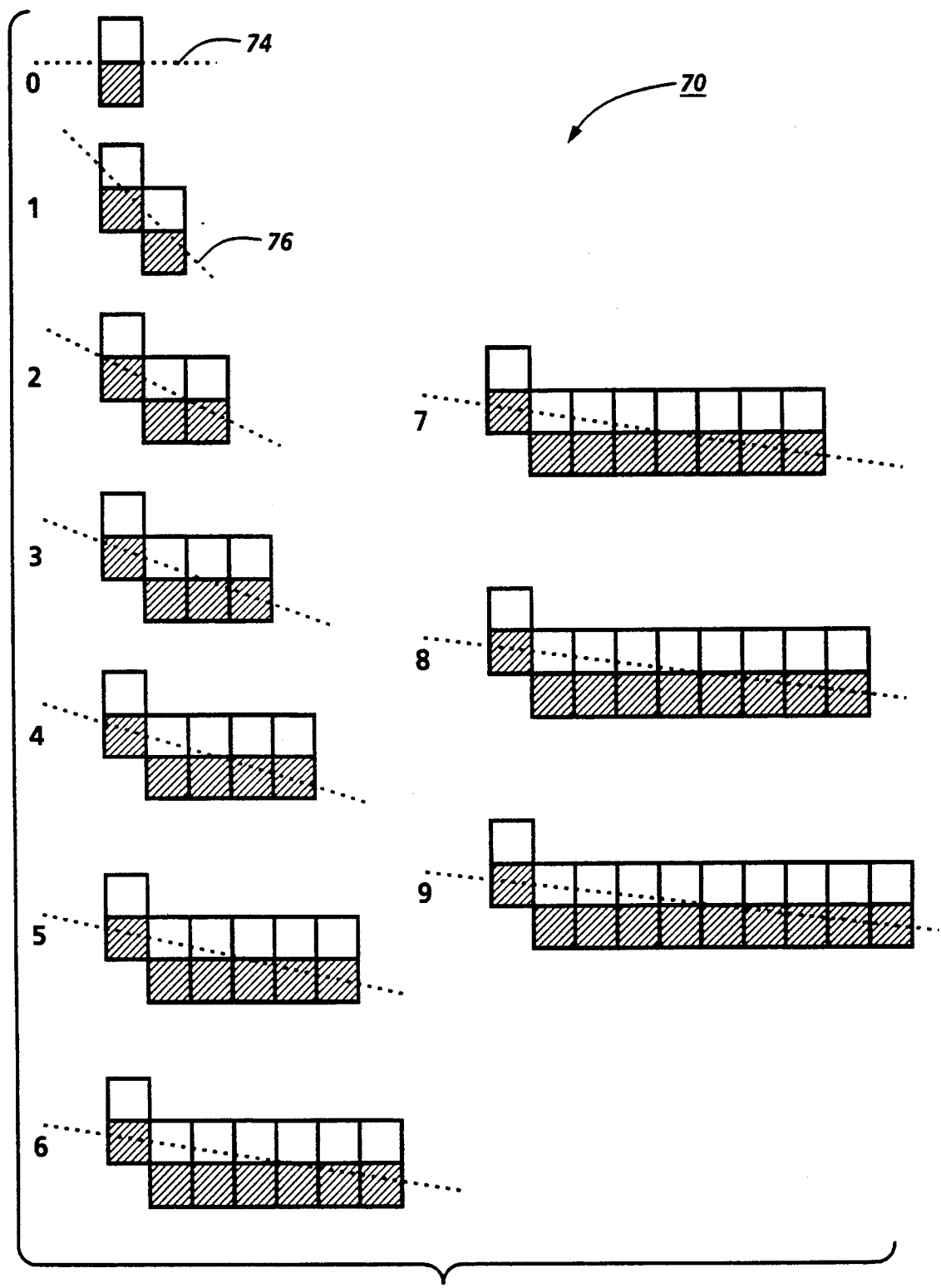
FIG. 3 shows set of patterns which represent a hierarchy of patterns for recognition of low fidelity bits which are to be enhanced.

FIG. 3 shows a pattern set 70 of "patterns" which represent a hierarchy of patterns for recognition of low fidelity bits which are to be enhanced. Printers or other devices which use template matching can use these patterns to detect edge lines which may be slightly horizontal or slightly vertical. The set is a "hierarchy" of ten patterns, in which the next higher member of the set is a composite of the previous member in the hierarchy and an extension pattern of two additional bits. This method of obtaining patterns saves gate resources in implementation, in that any pattern is simply the combination of the next lower priority pattern plus two additional bits, one "on" and the other "off". In the ten pattern set shown in FIG. 3 the highest priority pattern is pattern 9, but fewer or more patterns may be utilized.

The patterns are designed to find the slope of portions of edges, or contours, in an image. In the method of the invention the largest, or highest, pattern which receives a match will have priority over smaller patterns, and the enhancement called for by that particular pattern will be utilized. If no pattern matches, then the portion of the image being examined is not an edge, and no enhancement action is taken. Pattern 0 will be identified as a match at any edge transition from white to black. Higher priority patterns are extensions of pattern 0, each with two additional bits, which will match edges that are not precisely horizontal or vertical. For example, line 74 shows an edge line that is precisely horizontal which is matched by pattern 0. Pattern 1, which has a "run-length" of 1, will match an edge approximately 45° from horizontal, shown by line 76. As the run-length of patterns increases, the angle of the edge that each pattern will match gets closer to horizontal. Pattern 9 has a run-length of 9.

Figure 4:
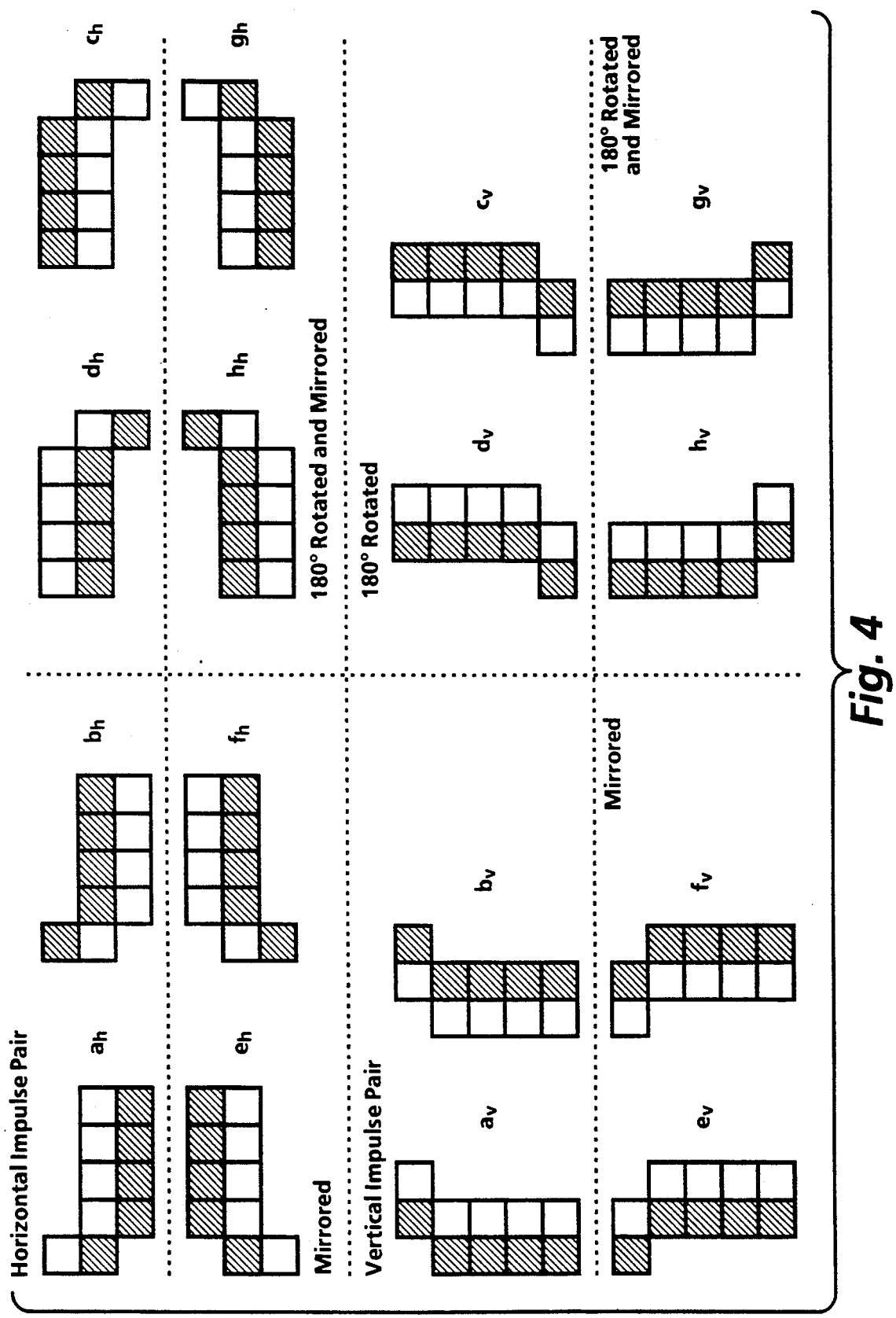
FIG. 4 shows a set of horizontal and vertical templates based on permutations of pattern 4 from FIG. 3.
Figure 5:
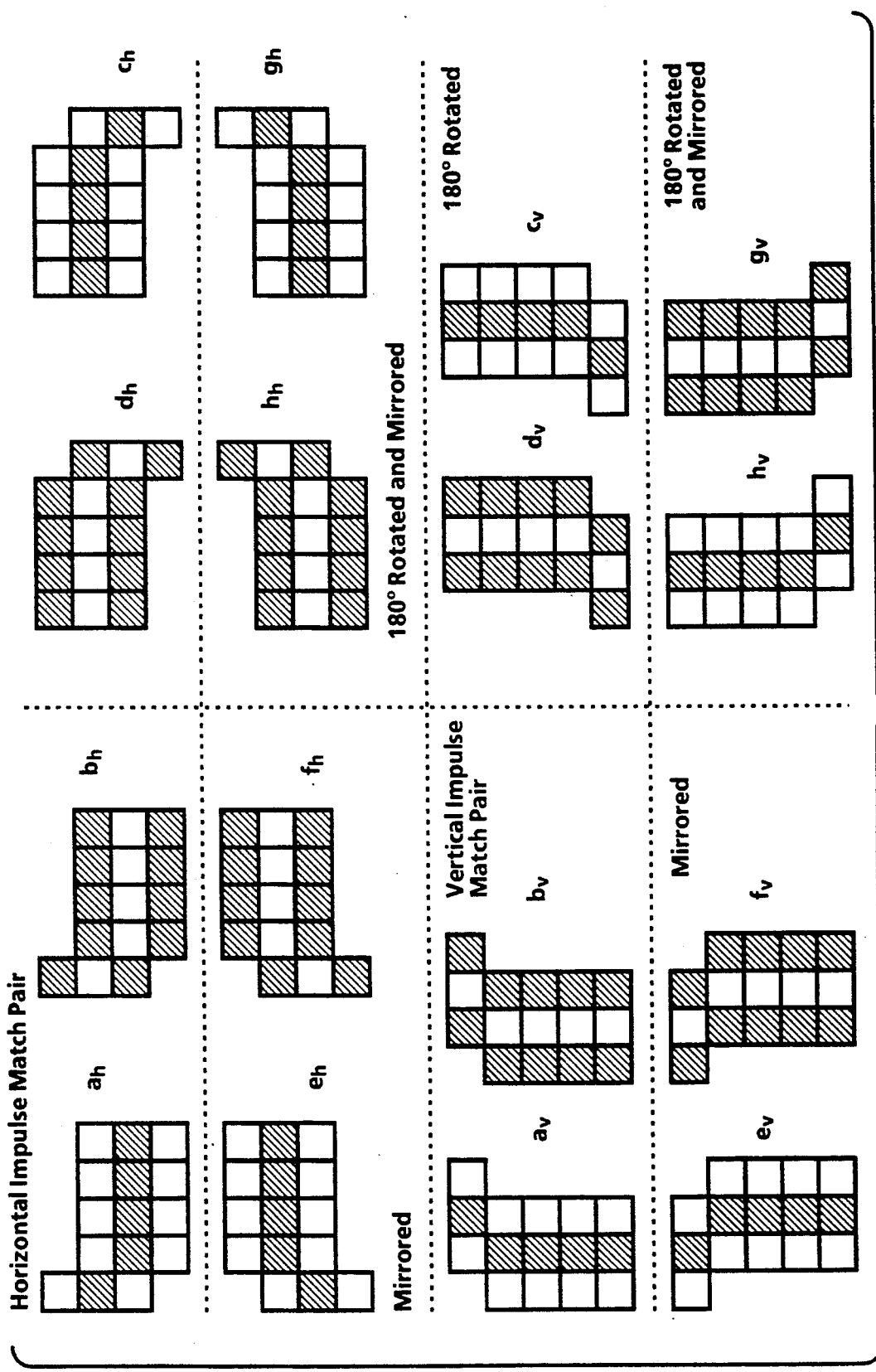
FIG. 5 shows a set of horizontal and vertical templates based on permutations of impulse match pattern 4 from FIG. 3.

Each pattern in the hierarchical set may further be used to define a set of templates. FIGS. 4 and 5 show a set of templates created from pattern 4. In FIG. 4, pattern 4 is rotated and mirrored in the horizontal and vertical directions to produce a set of 16 templates. Template $a_h$ describes the basic pattern. Template $b_h$ is the complement of the basic pattern. Together, these two templates are called an "impulse pair"

When templates $a_h$ and $b_h$ are rotated 180° another impulse pair is created by templates $c_h$ and $d_h$. These four templates are then mirrored, creating two additional impulse pairs made up of templates $e_h$ and $f_h$ and templates $g_h$ and $h_h$.

Eight additional templates, or 4 impulse pairs, are created when templates $a_h$-$h_h$ are rotated 90°. Templates $a_h$-$h_h$ are herein referred to as "horizontal" templates, and templates $a_v$-$h_v$ are herein referred to as "vertical" templates. Templates $a_h$-$h_h$ and $a_v$-$h_v$ are herein referred to as "permutations" of pattern 4.

A match of both templates of an impulse pair, as shown in FIG. 5, denotes the existence of an "impulse match" denoting a black or white line with a width of one bit. When matches for both templates in an impulse pair occur, they may be treated differently that when only one template from the impulse pair is recognized or if both templates in the pair were matched independently, and different enhancement information may be output. Matches for single templates of an impulse pair denote transitions from black to white or white to black over widths wider than a single bit. A basic impulse match may be rotated and mirrored in both the horizontal and vertical directions in the same way that the basic pattern was in FIG. 4, to create an additional 16 templates.

Each pattern in the hierarchical set 70 may be used to create a similar set of 32 templates of different permutations. Additional patterns or combinations of patterns or templates with different extension patterns may be combined to recognize other objects such as crossed lines and corners.

Figure 6:
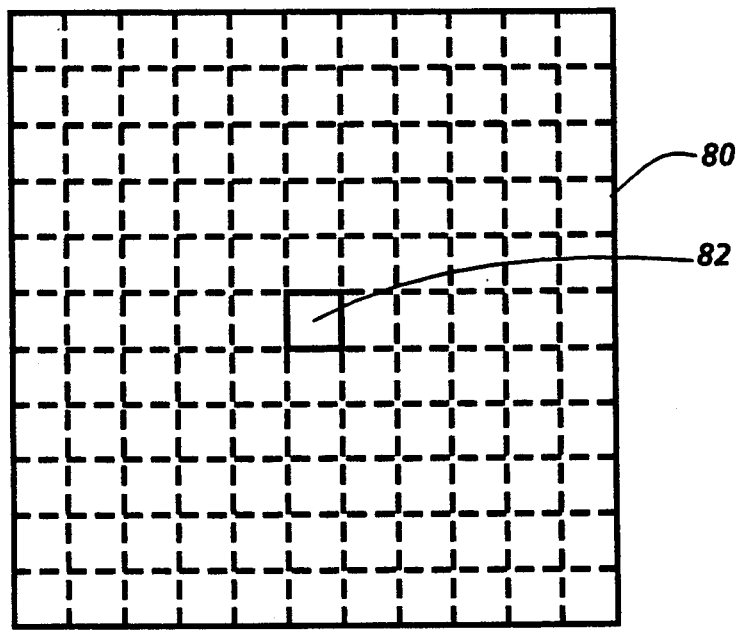
FIG. 6 shows an input window used to determine the area of the image.

FIG. 6 shows an input window 80 to be used to determine the area of the image to be matched by the templates. An input window is defined as the area of the input low resolution bitmap over which patterns can be found. Central pixel 82 is the pixel which will receive enhanced correction information. Input window 80 is shown with a size of 11×11 pixels. However, size of the input window is important only to the extent that it allows the recognition of all patterns, It may be adjusted up or down in size in the design as required. The technique of the invention makes symmetrical corrections- that is, corrections can be made to the vertical direction with the same precision as in the horizontal direction, to either side of the center point. A window that is as tall as it is wide, with an equal number of pixels along each axis to each side of the center point, is called a "symmetrical" window. For pixels which are near the edge of the image, the side of the window that is truncated by the edge of the image is considered to be filled with "off" pixels.

An input window of size 11×11 is appropriate for the hierarchical set of patterns 70 in FIG. 3. Pattern 6, with a run-length of 6, fits entirely within the window at its first correctable pixel at the center pixel location. It can be shown that patterns of larger run-length, such as pattern 9, will also fit. In consideration of current economics of design and of output resolution capabilities, patterns of run-lengths of greater than 6 may not give discernibly better results than achieved using a hierarchy that includes patterns 0–6.

Figure 7:
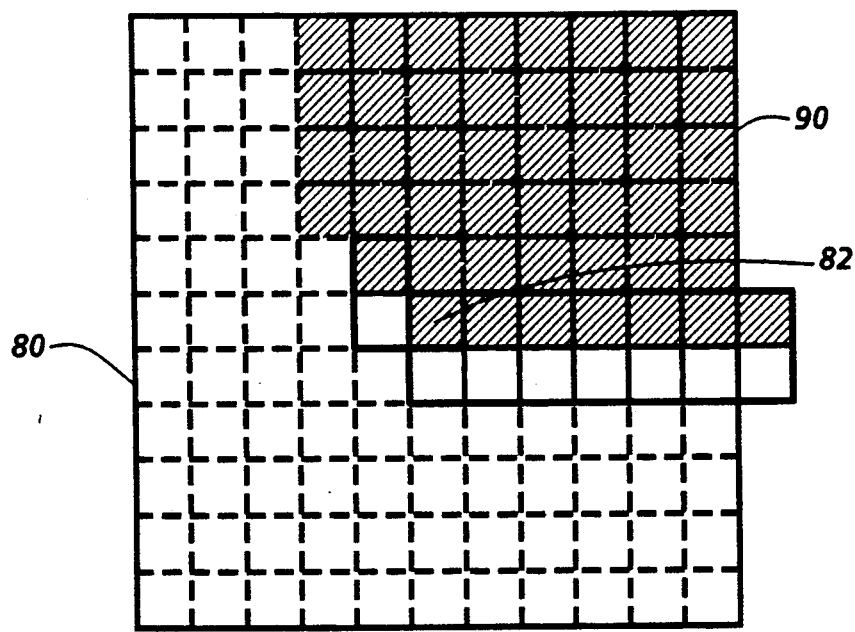
FIG. 7 shows a portion of an image in an input window similar to FIG. 6.

FIG. 7 shows a portion of an image 90 in input window 80. As shown, a portion of the image matches pattern 7, but only the portion matching pattern 6 is visible inside the window. Pixel 82, the central pixel, is in a correctable position for both pattern 6 and 7, but will receive enhancement information corresponding to pattern 6. As the window shifts locations over the image, other correctable pixels in the pattern may be detected.

Figure 8:
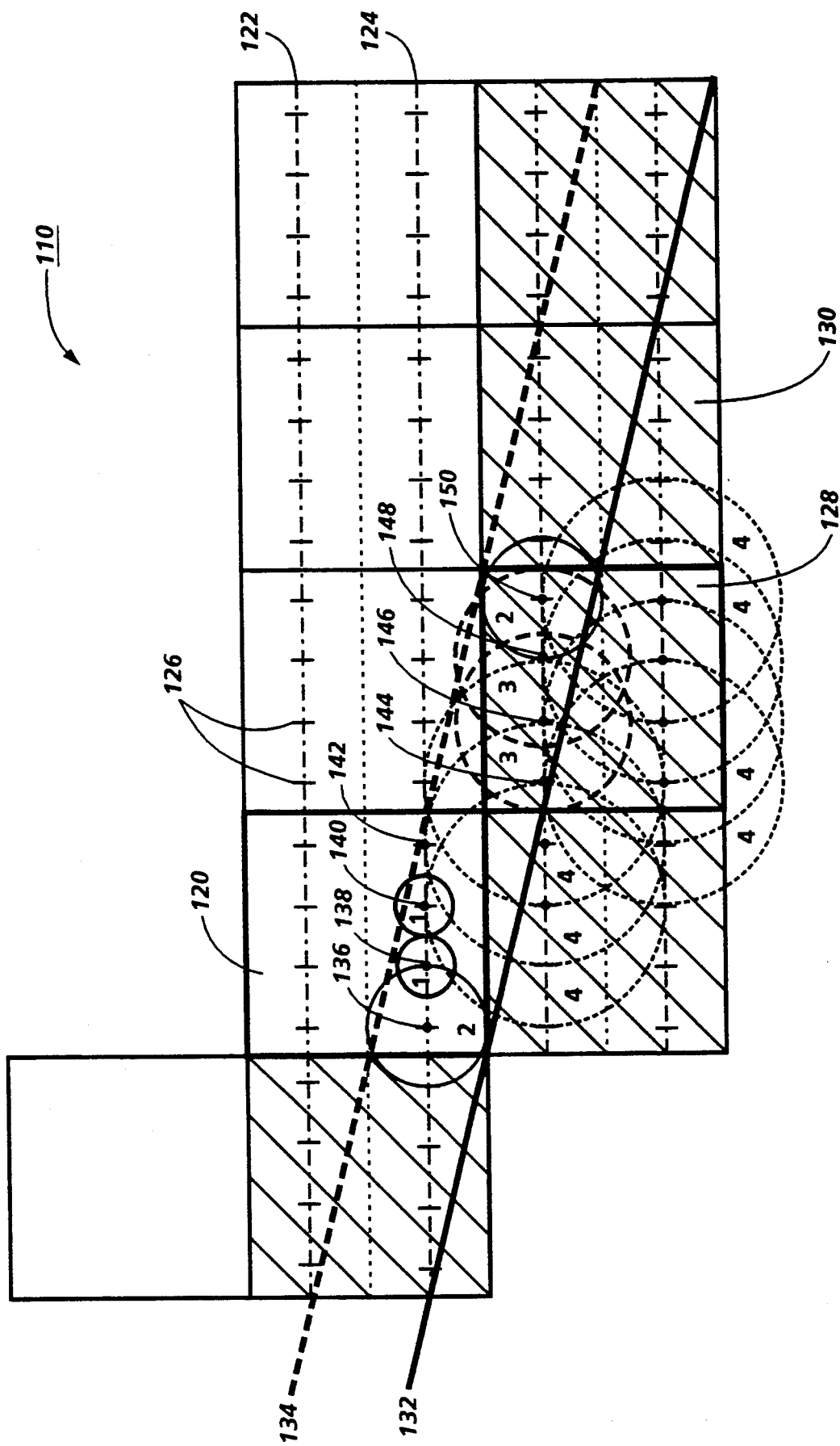
FIG. 8 illustrates an enhancement application in a group of pixels.

FIG. 8 illustrates an enhancement of a group of pixels forming a portion of an image. Group 110 encompasses a group of pixels that matches pattern 4, permutation $a_h$, as shown in FIG. 4. For this example, it is assumed that this portion of the image does not match any impulse match template (i.e., the width of the image represented in part by the pixel group is greater than 1 pixel wide), or any higher priority template. Lines 122 and 124 illustrate the first and second scan lines, respectively, of the overscan. Marks 126 show the clock frequency in the fast scan direction. Line 132 shows the trajectory of the line of the edge illustrated by the group of pixels. Line 134 shows the corrected edge in the enhancement. The enhanced edge is one half of the maximum spot diameter from the original trajectory.

As discussed above, the central pixel can be divided into eight segments, each with a different gray level or intensity value. The first pixel to be corrected is pixel 120. In the original image input, pixel 120 is entirely white. The first, or top scan of this pixel will also be entirely white. Correction of the pixel to the enhanced edge will be made in the second, or bottom scan of pixel 120. Scan spot 136 shows a spot of intensity 2 that significantly fills in the area between the original trajectory and the enhanced edge to correct the line at the first clock cycle. Scan spot 138 of intensity 1 significantly fills in the area to the enhanced edge at the second clock cycle. Scan spot 140 also has an intensity of 1 at the third clock cycle. At the fourth clock cycle, mark 142, no correction spot is required because the intensity 4 spots in the black pixel below it significantly fill in the area to the enhanced edge at that location, so the intensity value at that point is zero. The expanded segment pattern of corrected values for pixel 120 is then 0000 and 2110 for the first and second scans, respectively.

Correction may also be made to pixel 128. At the first clock cycle in the fast scan direction, a scan spot of intensity 4, shown by scan spot 144, is needed. Scan spot 146 at the second clock cycle has an intensity of 3. Scan spot 148, at the third clock cycle, also has an intensity of 3. Scan spot 150 has an intensity of 2 at the fourth clock cycle. The second scan of pixel 128 needs no correction, so scan spots of intensity 4 will be output at each clock cycle. The expanded segment pattern of corrected values of pixel 128 is then 4332 and 4444 for the first and second scans, respectively.

Figure 9:
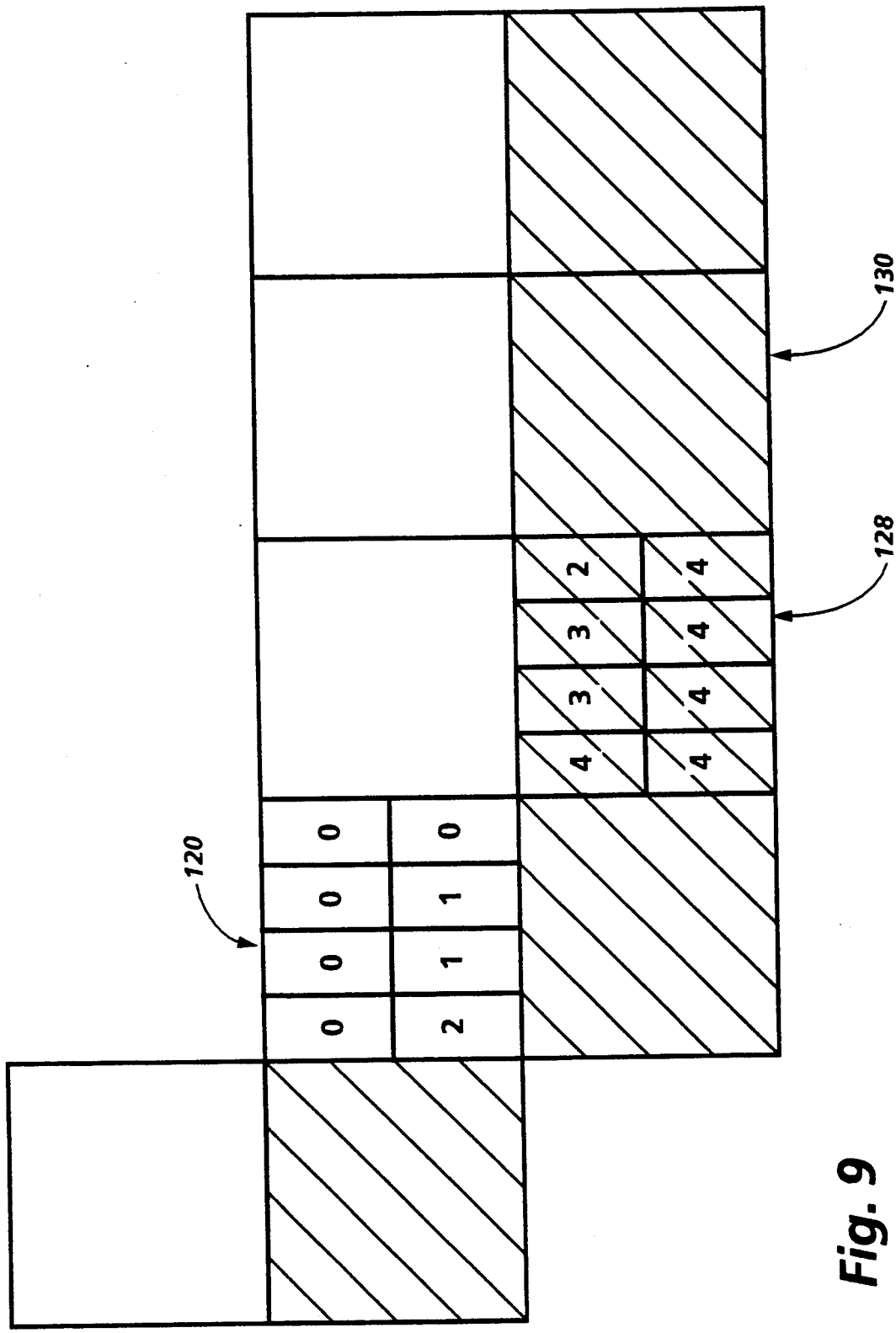
FIG. 9 shows the resulting enhancement values of pixels in a pattern as a result of the operations shown in FIG. 8.

FIG. 9 shows the resulting expanded pattern of intensity values according to the method performed in FIG. 8. When pixel 120 is in the central pixel position of window 80 of FIG. 6 when a match with template 4 permutation $a_h$ is found, it will be enhanced with segments with gray level intensities of 0 0 0 0 in the first scan, and 2 1 1 0 in the second scan. Similarly, when pixel 128 is the central pixel, it will be enhanced with segments with gray level intensities of 4 3 3 2 and 4 4 4 4, shown in Table 1. If a match with this pattern is made when pixel 130 is in the central pixel position, no enhancements are made according to this pattern and the segments represent the original pixel. However, pixel 130 is likely to fall in the correctable range of another template.

If a different permutation template of pattern 4 was the highest priority match, Tables 1 or 2 could be used to determine the enhancement values of segments for the central pixel. If a permutation of an impulse match of pattern 4 was the highest priority match, Tables 3 or 4 could be used to determine the enhancement values of segments for the central pixel.

The results of the kind of operation shown in FIGS. 8 and 9 are shown in Table 1. As shown in the table, pixels 120 and 128 are the only pixels to be corrected in this pixel group. Values for pixel 120 are shown in the Pixel 2 column in Table 1. Values for pixels which occur in the position of pixel 128 are shown in the Pixel 1 column.

Tables 1-4 show enhancement values of segments for the pixels which will be enhanced in pattern 4 for different permutations and impulse match permutations. Similar tables of enhancement values for horizontal, vertical and impulse match templates up to run-length of 6 are found in Appendix A. The tables in Appendix A may be used to find the enhancement values for correctable pixels in templates of different run-lengths.

TABLE 1

Enhancement values for horizontal templates

| Template Permutation | Example | Pixel1 | Pixel2 |
|---|---|---|---|
| $a_h$ |  | B 4332 4444 | W 0000 2110 |
| $b_h$ | See FIG. 4 | B 2334 0000 | B 4444 0112 |
| $c_h$ | See FIG. 4 | B 4444 2334 | W 0112 0000 |
| $d_h$ | See FIG. 4 | B 0000 4332 | B 2110 4444 |
| $e_h$ | See FIG. 4 | B 4444 4332 | W 2110 0000 |
| $f_h$ | See FIG. 4 | B 0000 2334 | B 0112 4444 |
| $g_h$ | See FIG. 4 | B 2334 4444 | W 0000 0112 |
| $h_h$ |  | B 4332 0000 | B 4444 2110 |

Tables 1 and 2 show templates which are permutations of basic pattern 4, Table 1 showing enhancement values for horizontal permutations, and Table 2 showing enhancement values for vertical permutations. As discussed above, the enhancement value for the central pixel is shown in one of the two columns, Pixel1 or Pixel2, depending on where in the pattern the central pixel lies. The data in these tables has been determined empirically. Small variations in the intensity of enhancement values of segments are likely to be imperceptible when output. Similarly, patterns which are longer than run-length 6 may not produce perceptibly better enhanced results when output, depending on the resolution of the output medium.

TABLE 2

Enhancement values for vertical templates

| Template Permutation | Example | Pixel1 | Pixel2 |
|---|---|---|---|
| $a_v$ |  | B 4440 4430 | W 3000 0000 |
| $b_v$ |  | B 0003 0004 | B 0034 0044 |
| $c_v$ |  | B 0344 0444 | W 0000 0003 |
| $d_v$ | See FIG. 4 for $b_v$–$g_v$ | B 4000 3000 | B 4400 4300 |
| $e_v$ |  | B 0444 0344 | W 0003 0000 |
| $f_v$ |  | B 3000 4000 | B 4300 4400 |
| $g_v$ |  | B 4430 4440 | W 0000 3000 |
| $h_v$ |  | B 0004 0003 | B 0044 0034 |

Tables 3 and 4 show enhancement values for the segments for pixels in impulse matches for pattern 4. For each impulse match template which is permuted from pattern 4, the enhancement values for the central pixel are shown in one of the four columns, according to where in the pattern the central pixel lies. Table 3 shows the values for horizontal impulse match templates, and Table 4 shows the values for vertical impulse match templates.

TABLE 3

Enhancement values for horizontal impulse match templates

| Template Permutation | Pixel1 | Pixel2 | Pixel3 | Pixel4 |
|---|---|---|---|---|
| $a_h$ black line | W 0000 2110 | B 2334 0000 | B 4332 0112 | no fix |
| $b_h$ white line | B 2334 0000 | B 4444 0112 | W 0000 2110 | B 4332 4444 |
| $c_h$ black line | W 0112 0000 | B 0000 4332 | B 2110 2334 | no fix |
| $d_h$ white line | B 0000 4332 | B 2110 4444 | W 0112 0000 | B 4444 2334 |
| $e_h$ black line | W 2110 0000 | B 0000 2334 | B 0112 4332 | no fix |
| $f_h$ white line | B 0000 2334 | B 0112 4444 | W 2110 0000 | B 4444 4332 |
| $g_h$ black line | W 0000 0112 | B 4332 0000 | B 2334 2110 | no fix |
| $h_h$ white line | B 4332 0000 | B 4444 2110 | W 0000 0112 | B 2334 4444 |

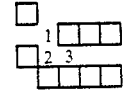

Template permutation for pattern $a_h$, $c_h$, $e_h$, $g_h$ black line impulse pair. One white and 2 black pixels have to be corrected for this template.

TABLE 3-continued

Enhancement values for horizontal impulse match templates

| Template Permutation | Enhancement level value of center pixel | | | |
|---|---|---|---|---|
| | Pixel1 | Pixel2 | Pixel3 | Pixel4 |

Template permutation for pattern $b_h$, $d_h$, $f_h$, $h_h$ white line impulse pair. One white and 3 black pixels have to be corrected for this template.

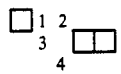

TABLE 4

Enhancement values for vertical impulse match templates

| Template Permutation | Enhancement level value of center pixel | | | | | | | |
|---|---|---|---|---|---|---|---|---|
| | Pixel1 | | Pixel2 | | Pixel3 | | Pixel4 | |
| $a_v$ black line | W | 3000 0000 | B | 0003 0004 | B | 0033 0040 | no fix | |
| $b_v$ black line | W | 0000 0003 | B | 4000 3000 | B | 0400 3300 | no fix | |
| $c_v$ black line | W | 0003 0000 | B | 3000 4000 | B | 3300 0400 | no fix | |
| $d_v$ black line | W | 0000 3000 | B | 0004 0003 | B | 0040 0033 | no fix | |
| $e_v$ white line | B | 0003 0004 | B | 0034 0044 | W | 3000 0000 | B | 4440 4430 |
| $f_v$ white line | B | 4000 3000 | B | 4400 4300 | W | 0000 0003 | B | 0344 0444 |
| $g_v$ white line | B | 3000 4000 | B | 4300 4400 | W | 0003 0000 | B | 0444 0344 |
| $h_v$ white line | B | 0004 0003 | B | 0044 0034 | W | 0000 3000 | B | 4430 4440 |

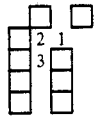

Template permutation for pattern $a_v$, $c_v$, $e_v$, $g_v$ black line impulse match. One white and 2 black pixels have to be corrected for this template.

Template permutation for pattern $b_v$, $d_v$, $f_v$, $h_v$ white line impulse match. One white and 3 black pixels have to be corrected for this template.

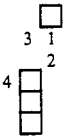

Figure 10:
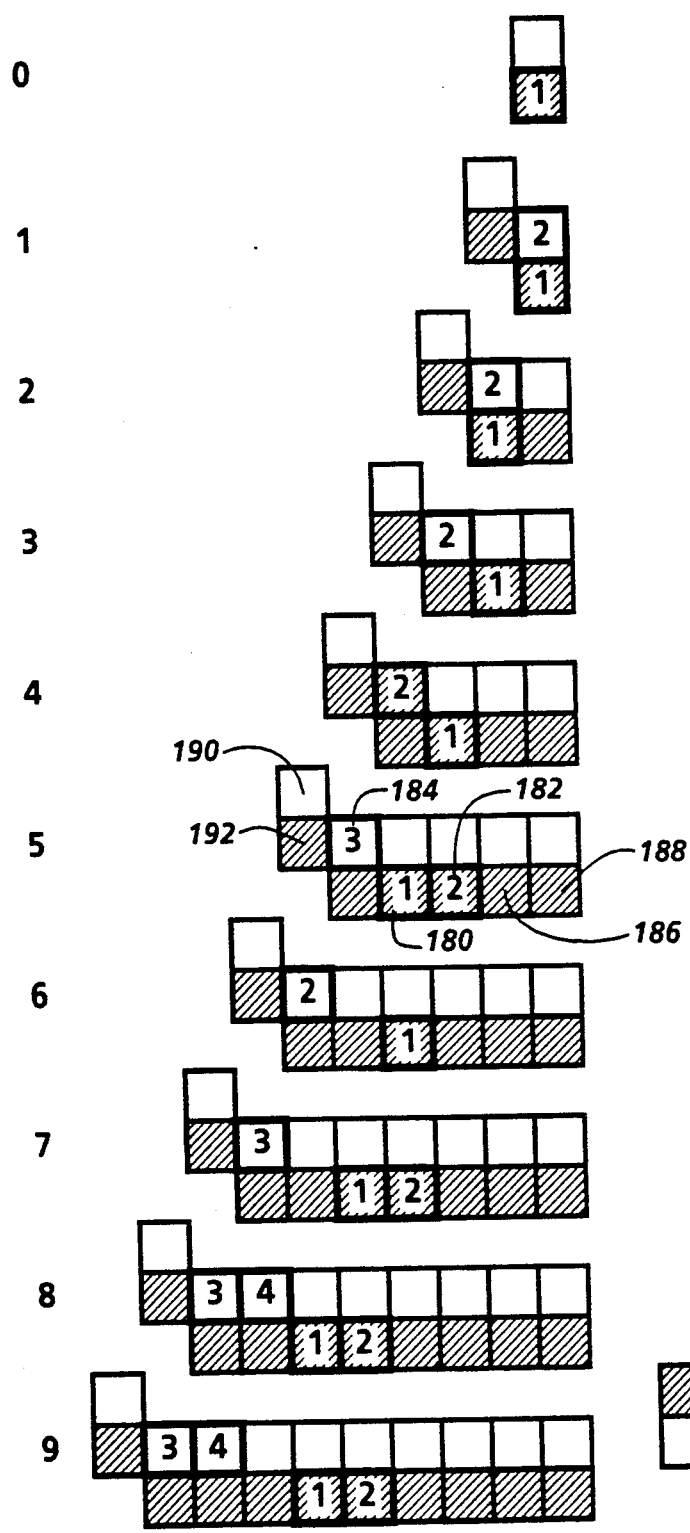
FIG. 10 shows pixels, indicated in bold, which need to be corrected when horizontal templates are matched.
Figure 10:
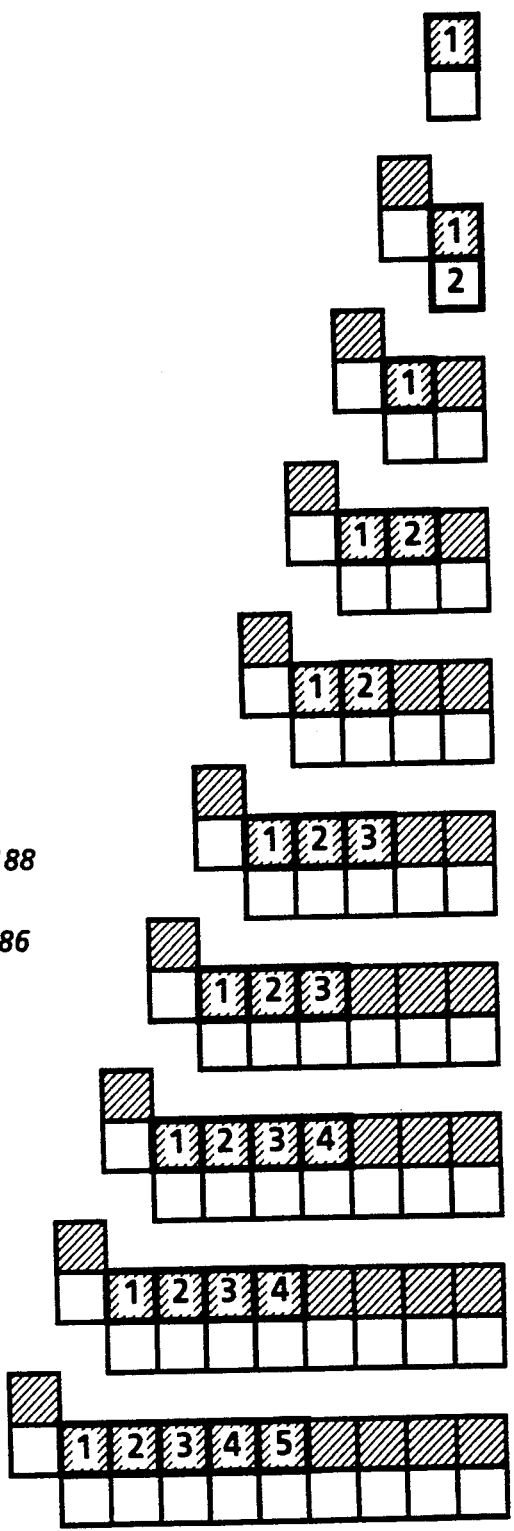
Figure 11:
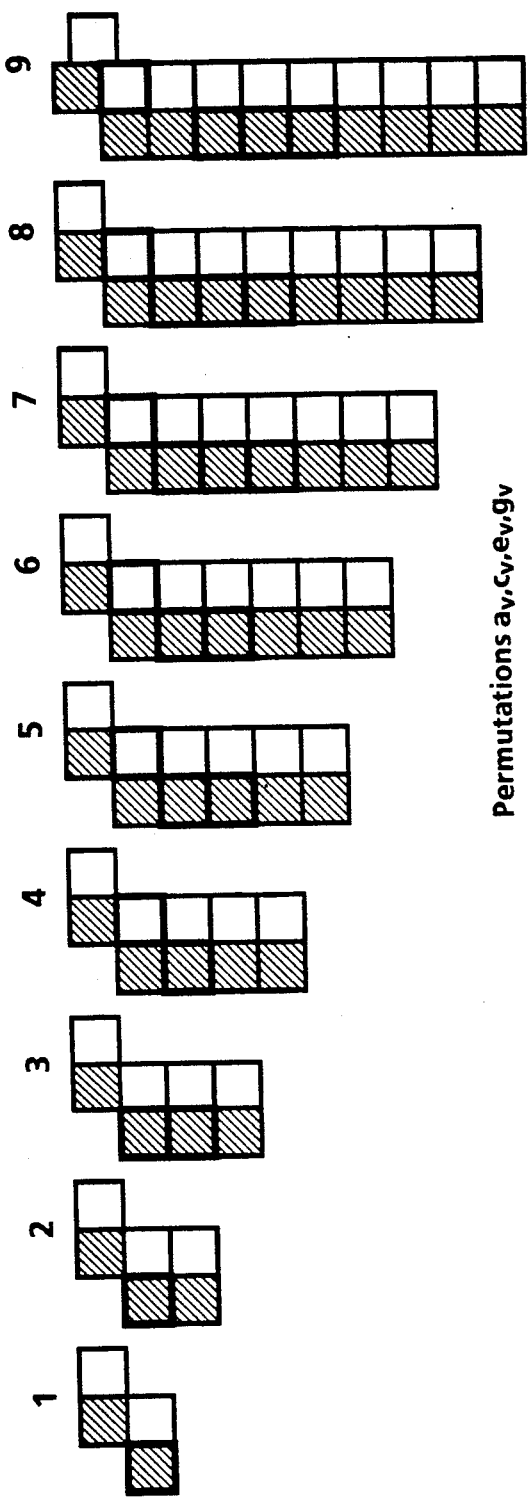
FIG. 11 shows pixels, indicated in bold, which need to be corrected when vertical templates are matched.
Figure 11:
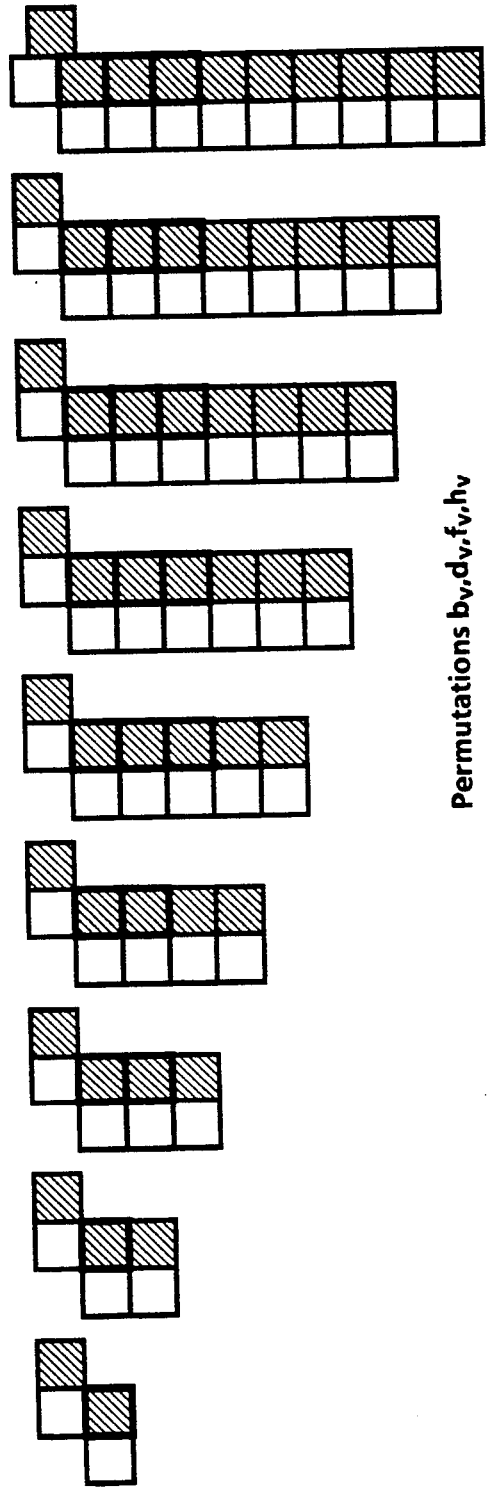

FIGS. 10 and 11 show pixels, in bold outline, which need to be corrected when a template is matched as the highest priority template. FIG. 10 shows the correctable pixel positions for horizontal patterns, and FIG. 11 shows the correctable pixel positions for vertical patterns. In order for an enhancement to be made, the pixels matching the template must be positioned in the input window 80 of FIG. 6 such that the central pixel 82 is in the position of one of the correctable pixel positions as shown in FIGS. 10 or 11. For example, if a horizontal permutation $a_h$, $c_h$, $e_h$, or $g_h$ of pattern 5 is matched in the input window, the pixels in locations corresponding to pixels 180, 182, and 184 will be corrected. Corrections are defined only for pixels of the inside half of the run-length, because the pixels outside that range are expected to be corrected by other permutations of the pattern, or by different patterns. If the center pixel does not fall in a correctable pixel position, then no correction is made for that template. Pixels 186 and 188 may be correctable in a mirror image permutation template, and pixels 190 and 192 may be correctable by a rotated or vertical permutation template. If the pixel does not lie in a correctable position in any of the templates, the segments will represent the original pixel with no enhancement, for example (0000,0000) for an entirely white pixel, or (4444,4444) for an entirely black pixel.

Figure 12:
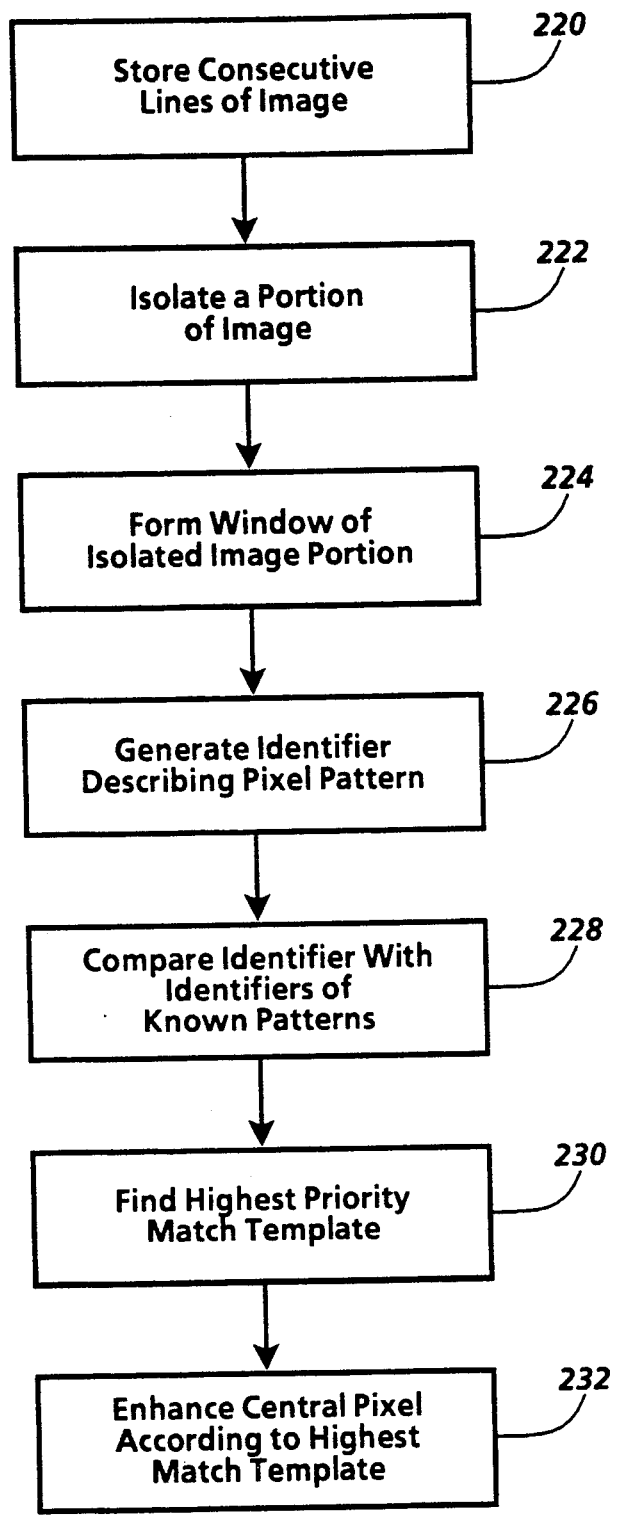
FIG. 12 shows a flowchart illustrating steps in enhancing a portion of an image.

The flowchart of FIG. 12 shows steps in enhancing a portion of an image. The step in box 220 stores consecutive lines of an image. The step in box 222 isolates a portion of the image. The step in box 224 forms a window in the isolated portion of the image. This window may be a symmetrical set of pixels around a central pixel.

The step in box 226 generates an identifier describing the pixel pattern. The step in box 228 compares the identifier of the window with the identifiers of known pixel patterns, or templates. The step in box 230 finds the highest priority template that is matched. The step in box 232 enhances the central pixel, according to the correction data for the highest priority matched template. If more than one template for a given pattern is detected and a pixel is correctable in both, enhancement information for the template corresponding to the lowest alphanumeric is given priority.

Figure 13:
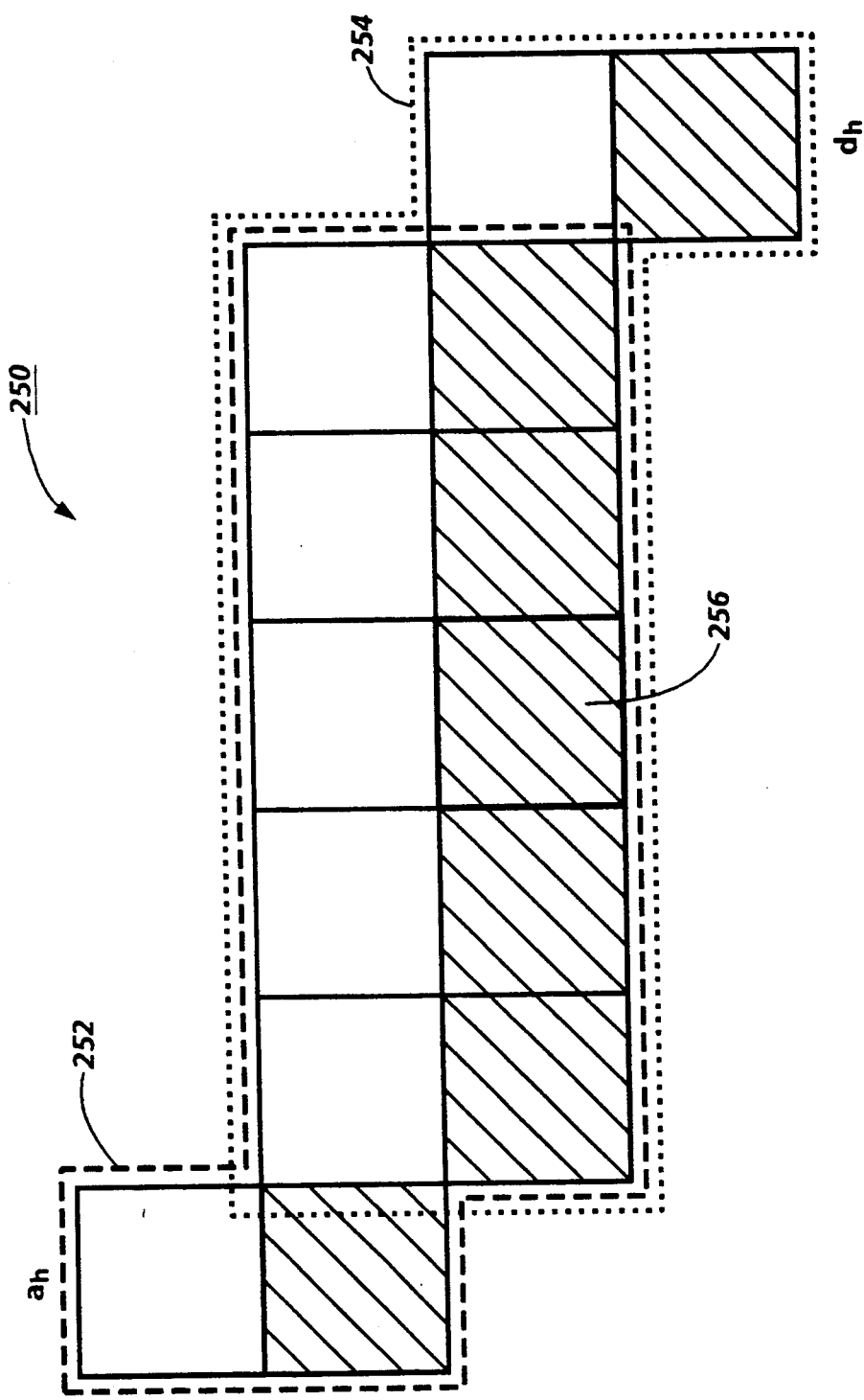
FIG. 13 shows an example of multiple templates permutated from pattern 5 matching a portion of text.

For example, in FIG. 13 a portion of an image 250 is shown. Template 252 shows that template $a_h$ based on pattern 5 matches on the portion of the image. Template 254 shows that template $d_h$ of pattern 5 also matches on the portion of the image. From FIG. 10, pixel 256 falls in a correctable pixel position in both templates 252 and 254. In this case, the enhanced segment values for the correctable pixel position of template $a_h$, template 252, would be used.

Figure 14:
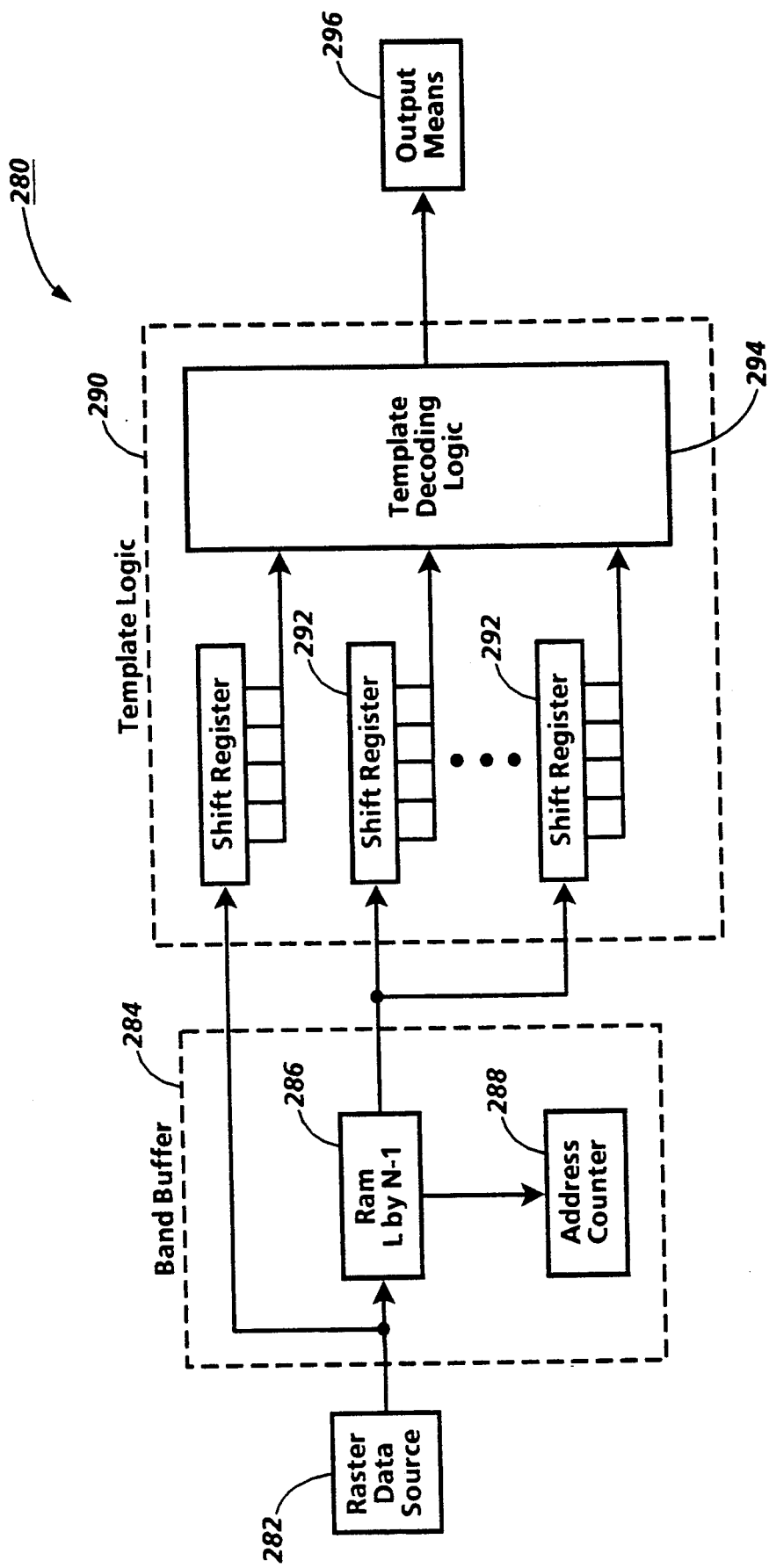
FIG. 14 shows a block diagram of an apparatus for performing the image enhancement in accordance with the present invention.

FIG. 14 shows a block diagram of an apparatus 280 for performing the image enhancement in accordance with the present invention. Raster Data Source 282 provides serial raster data to Band Buffer 284, formed by RAM 286 controlled by Address Counter 288. RAM 286 stores a field of $(L \times N - 1)$, where L is the number of bits in a line of the input, and N is the height of the input window. The Nth line is shifted directly into the shift register to form an N height window. The number of bits in a line L will vary by the input data source, for example for a CRT the line length may be 1000 bits, but for a large-scale printer the number of bits in a line may be such as much as 8000 bits. On a typical laser printer with number of bits per line L of 300 and an 11 inch line, a typical RAM size for implementing an 11×11 window may be about (3300 bits×11 lines). RAM 286 and Address Counter 288 form a circular band buffer which steps line by line through the input. Alternatively, the band buffer could be made up of a series of shift registers which perform the same function. Band Buffer 284 provides input data lines to Template Logic 290.

Template Logic 290 is made up of a plurality of shift registers 292. There are N shift registers, one for each line of the input window. The shift registers 292 input data into Template Decoding Logic 294 to form the input window. In Template Decoding Logic 294, the input window is examined for matches with a hierarchical set of templates. Template Decoding Logic 294 examines primarily the pixels around the center axis of the input window, but data for the entire input window may be received from the shift registers 292. Template Decoding Logic 294 may compare the data with templates either serially or in parallel. The enhanced segment data for the corrected pixel is output from Template Logic 290 to output means 296, which may be a microaddressable display means.

Figure 15:
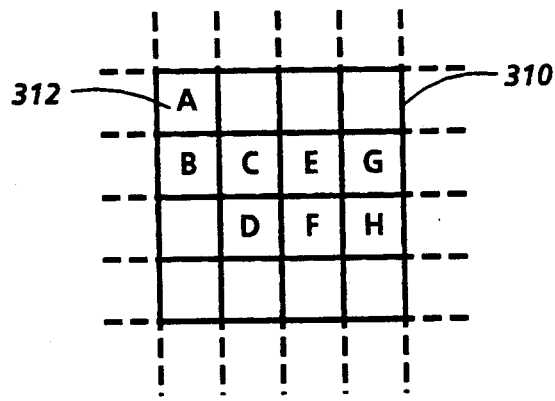
FIG. 15 shows a portion of an image.
Figure 16:
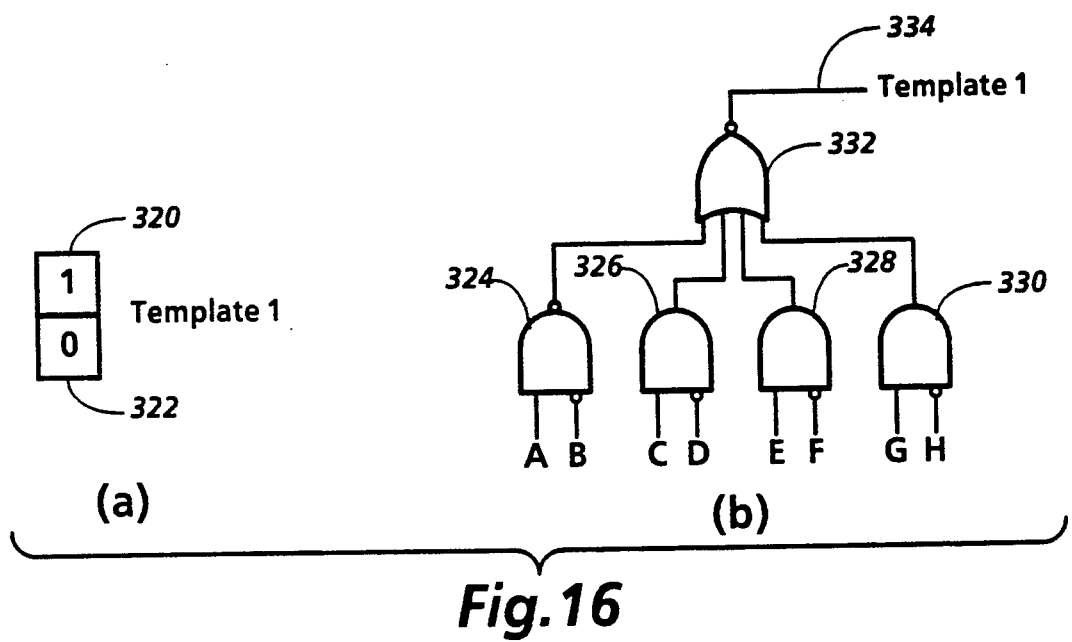
FIGS. 16–19 show typical implementations of template detecting circuitry.
Figure 17:
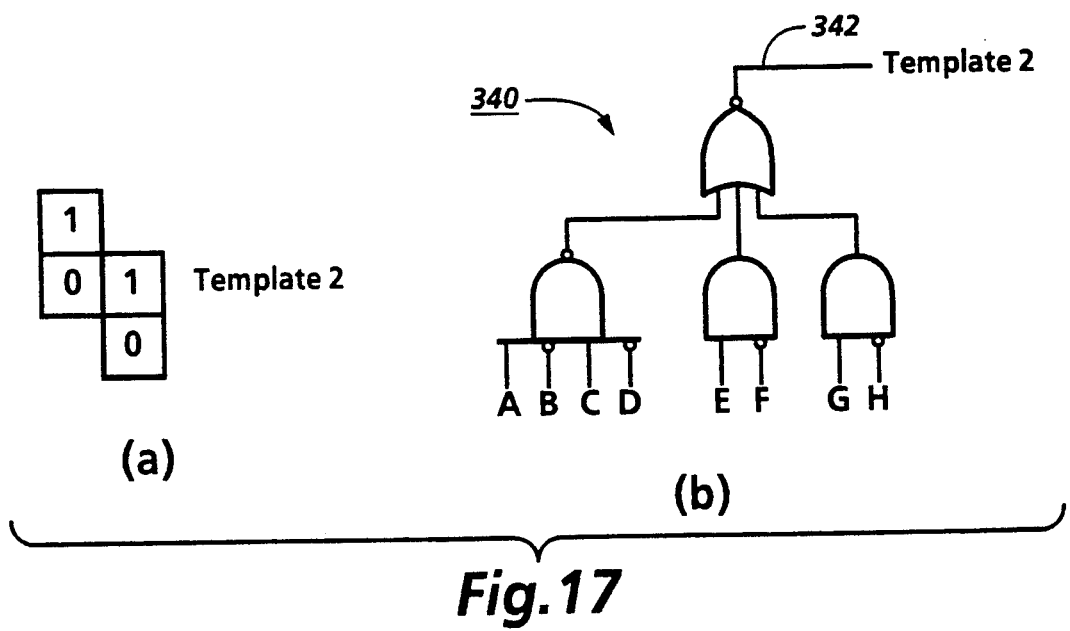
Figure 18:
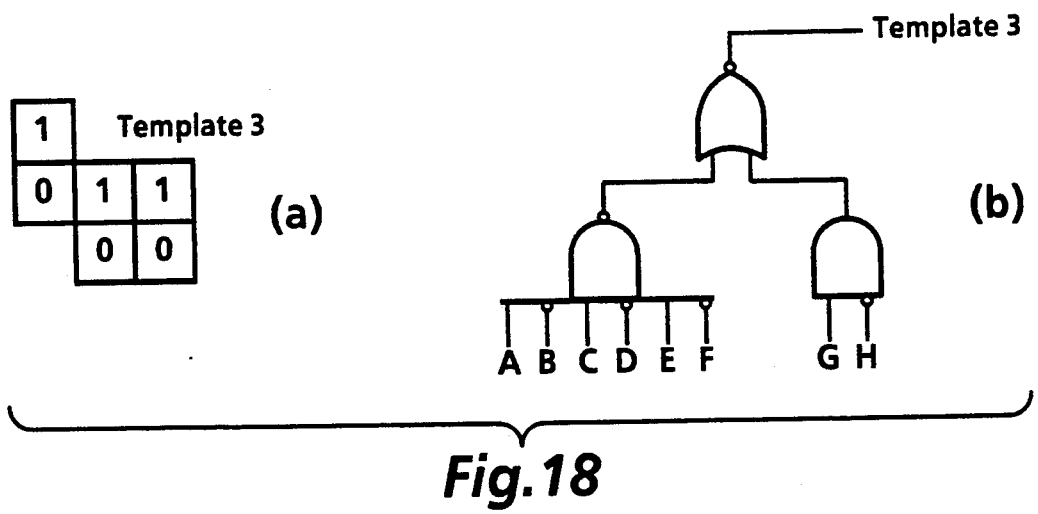
Figure 19:
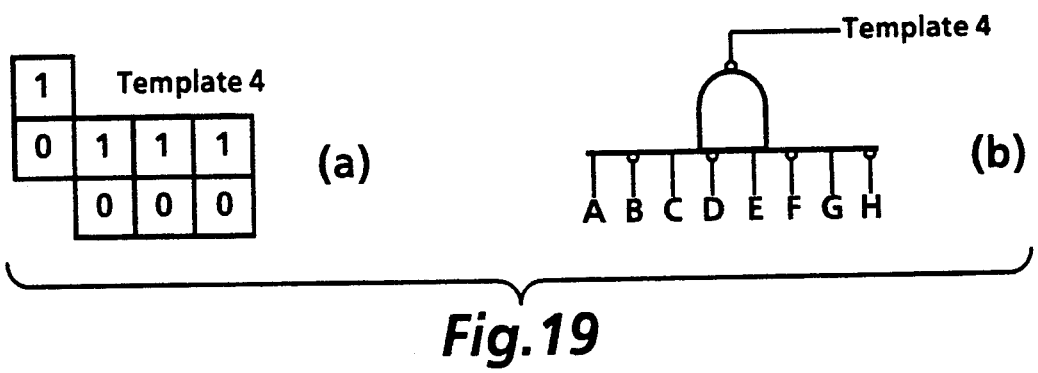

FIGS. 15-20 describe methods of implementing Template Decoding Logic 294. FIG. 15 shows a portion of an input window 310 with pixel locations labeled A-H. For this example, pixel A 312 is taken to be in the central pixel position. Each pixel location will provide a signal A-H to the template decoding logic describing the bit value of the pixel.

FIGS. 16-19 describe a typical way in which templates may be decoded. FIG. 16(a) shows the first template to be decoded in this example, a two pixel template in which the top pixel 320 has a bit value of "1", and the bottom pixel 322 has a bit value of "0". FIG. 16(b) shows a typical implementation of logic to detect the presence of this template. Gate 324 tests signals A and B. Gates 326, 328, and 330 also test signals C and D, E and F, and G and H, respectively, for matches with the template. If the signals from A and B describe a match with template 1 and none of the other signals match the template, the output 334 from gate 332 will indicate a match for template 1.

FIG. 17(a) shows the second template, template 2. Circuit 340 in FIG. 17(b) surveys signals A, B, C, and D for a match with template 2. If the signals match template 2 and signals E, F, G, and H do not indicate a match with the next template, the output signal 342 will indicate a match with template 2. The circuit in FIG. 18(b) similarly tests for a match with template 3 in FIG. 18(a), and the circuit in FIG. 19(b) similarly tests for a match with template 4 in FIG. 19(a). Clearly, the circuitry increases exponentially with the size of the template set.

Figure 20:
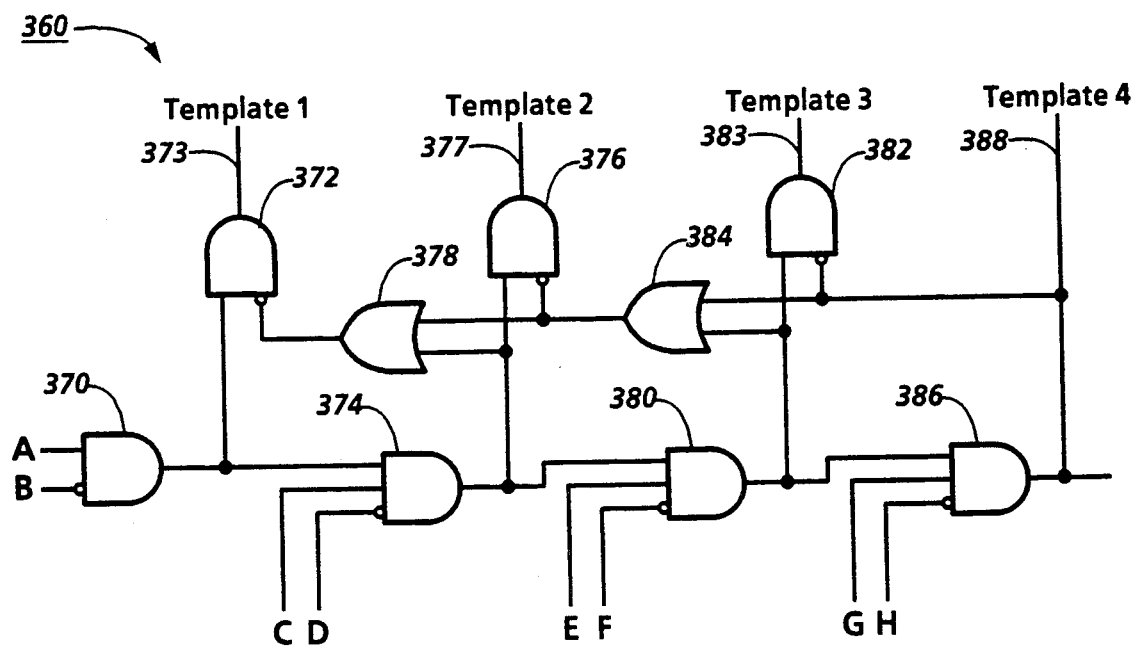
FIG. 20 shows an improved circuit implementation which detects matches with hierarchial templates.

FIG. 20 shows a circuit 360 that may be employed in the template decoding logic using templates related to patterns similar to set 70 of FIG. 10. The hierarchical nature of the pattern set allows the circuit to build upon itself for each successive pattern in the hierarchy, thereby significantly reducing the number of gates necessary for the implementation. Gate 370 detects a match of template 1 by signals A and B. Gate 374 uses the output of gate 370 indicating a match of template 1 and input from signals C and D to detect a match of template 2. Gate 380 uses the output of gate 374 indicating a match of template 2 and input from signals E and F to detect a match of template 3. Gate 386 uses the output of gate 380 indicating a match of template 3 and input from signals G and H to detect a match of template 4.

If only template 1 is matched, gate 372 will indicate a match to output signal 373. If gate 374 indicates a match with template 2, the output signal from 374 will be input to gate 378, which will disable gate 372 and inhibit signal 373 from indicating the match with template 1, so only the match with the highest priority template will be indicated. Similarly, if the output signal from gate 380 indicates a match with template 3, gate 384 will turn off the output of gate 376 and inhibit signals 377 and 373 from indicating a match with template 2 of template 1. Signal 388 output from 386 will also inhibit the previous template match signals if gate 386 indicates a match with template 4.

Due to the hierarchical nature of pattern types of the invention, the number of gates in circuit 360 will naturally increase linearly with the size of the template set, rather than exponentially.

Conclusion

In view of the foregoing, it now will be evident that the present invention provides economical and technically attractive methods for ernhancing the contour fidelity of exposures in microaddressable display systems. These methods employ hierarchical template matching and spot width compensation techniques to smooth contours and jagged edges commonly found in bit-mapped images.

Although the invention has been described in relation to a single beam operation, the technique could be performed independently by each beam of a multi-beam operation. Although the invention has been described in relation to a 2× overscanned printer, the technique could be performed to enhance the contour fidelity on any optical display system, including but not limited to increased precision or microaddressable optical printers.

In addition, although the invention has been described in relation to various implementations, together with modifications, variations and extensions thereof, other implementations, modifications, variations and extensions are within the scope of the invention. The invention is therefore not limited by the description contained herein or by the drawings, but only by the claims.

Enhancement Table Appendix

Appendix A contains tables of enhancement values for templates up to run length of 6. Table 1 shows enhancement values for templates made of pattern 0, and impulse match templates based on pattern 0. Tables 2 and 3 show enhancement values for templates based on basic pattern 1. Tables 4–7 show enhancement values for templates based on basic pattern 2. Tables 8–11 show enhancement values for templates based on basic pattern 3. Tables 12–15 show enhancement values for templates based on basic pattern 4. Tables 16–19 show enhancement values for templates based on basic pattern 5. Tables 20–23 show enhancement values for templates based on basic pattern 6. The values in the tables have been determined empirically, and small variations in the intensity of enhancement values are likely to be imperceptible when output.

APPENDIX A

TABLE 1

APPENDIX A
Enhancement values for Pattern 0

| Template Permutations | Example | Enhancement level value of center pixel | |
|---|---|---|---|
| | | Pixel 1 | Pixel 2 |
| av | 1 ☐ | B 4430 4430 | |
| bv | ☐ 1 | B 0344 0344 | |
| ah | 1 ☐ | B 4444 2222 | |
| bh | ☐ 1 | B 2222 4444 | |
| av black line | ☐ 1 ☐ | B 0330 0330 | |
| bv white line | 1 ☐ 2 | B 4430 4430 | B 0344 0344 |
| ah black line | ☐ 1 ☐ | B 2222 2222 | |
| bh white line | 1 2 | B 4444 2222 | B 2222 4444 |

TABLE 2

Enhancement values for templates based on Pattern 1

| Template Permutations | Example | Enhancement level value of center pixel Pixel1 | Pixel2 |
|---|---|---|---|
| a, c | □₁₂ | W 0000 / 1000 | B 4000 / 4440 |
| b, d | □²₁ | W 0001 / 0000 | B 0444 / 0004 |
| e, h | ²□₁ | W 1000 / 0000 | B 4440 / 4000 |
| f, g | □₁₂ | W 0000 / 0001 | B 0004 / 0444 |

TABLE 3

Enhancement values for impulses matches based on Pattern 1

| Template Permutations | Example | Enhancement level value of center pixel Pixel1 | Pixel2 |
|---|---|---|---|
| Black line | □ᵗ ²□ᵇ | W 0000 / 1000 / 0001 / 0000 | B 2300 top / 0123 / 0001 bottom |
| Black line | □ᵗ ²□ᵇ | W 0000 / 0001 / 1000 / 0000 | B 0023 top / 3210 bottom |
| White line | □ᵗ ₁ᵇ | W 0001 / 1000 | B 0444 top / 0004 / 4000 bottom / 4440 |
| White line | ᵗ□ ₁ᵇ | W 1000 / 0001 | B 4440 top / 4000 / 0004 bottom / 0444 |

TABLE 4

Enhancement values for horizontal templates based on Pattern 2

| Template Permutations | Example | Enhancement level value of center pixel Pixel1 | Pixel2 |
|---|---|---|---|
| aₕ | □²□₁ | B 4432 / 4444 | W 0000 / 2100 |
| bₕ | □₁ | B 0344 / 0012 | |
| cₕ | ₁□²□ | B 4444 / 2344 | W 0012 / 0000 |

TABLE 4-continued

Enhancement values for horizontal templates based on Pattern 2

| Template Permutations | Example | Enhancement level value of center pixel Pixel1 | Pixel2 |
|---|---|---|---|
| dₕ | □□₁ | B 2100 / 4430 | |
| eₕ | ₁²□ | B 4444 / 4432 | W 2100 / 0000 |
| fₕ | □₁ | B 0012 / 0344 | |
| gₕ | ²□₁ | B 2344 / 4444 | W 0000 / 0012 |
| hₕ | ₁□ | B 4430 / 2100 | |

TABLE 5

Enhancement values for vertical templates based on Pattern 2

| Template Permutations | Example | Enhancement level value of center pixel Pixel1 |
|---|---|---|
| aᵥ | ₁□ | B 4444 / 4440 |
| bᵥ | □₁ | B 0004 / 0044 |
| cᵥ | ₁□ | B 0444 / 4444 |
| dᵥ | ₁□ | B 4400 / 4000 |
| eᵥ | ₁□ | B 4444 / 0444 |
| fᵥ | ₁□ | B 4000 / 4400 |
| gᵥ | ₁□ | B 4440 / 4444 |
| hᵥ | ₁□ | B 0044 / 0004 |

TABLE 6

Enhancement values for horizontal impulses matches based on Pattern 2

| Template Permutations | | Enhancement level value of center pixel | | |
|---|---|---|---|---|
| | | Pixel1 | Pixel2 | Pixel3 |
| $a_h$ black line | | W 0000 2100 | B 0330 0012 | |
| $b_h$ white line | | W 0000 2100 | B 4432 4444 | B 0344 0012 |
| $c_h$ black line | | W 0012 0000 | B 2100 0330 | B |
| $d_h$ white line | | W 0012 0000 | B 4444 2344 | B 2100 4430 |
| $e_h$ black line | | W 2100 0000 | B 0012 0330 | B |
| $f_h$ white line | | W 2100 0000 | B 4444 4432 | B 0012 0344 |
| $g_h$ black line | | W 0000 0012 | B 0330 2100 | B |
| $h_h$ white line | | W 0000 0012 | B 2344 4444 | B 4430 2100 |

TABLE 7

Enhancement values for vertical impulses matches based on Pattern 2

| Template Permutations | | Enhancement level value of center pixel | |
|---|---|---|---|
| | | Pixel1 | Pixel2 |
| $a_v$ black line | | B 0004 0040 | |
| $b_v$ white line | | B 4444 4440 | B 0004 0044 |
| $c_v$ black line | | B 0400 4000 | |
| $d_v$ white line | | B 0444 4444 | B 4400 4000 |
| $e_v$ black line | | B 4000 0400 | |
| $f_v$ white line | | B 4444 0444 | B 4000 4400 |
| $g_v$ black line | | B 0040 0004 | |
| $h_v$ white line | | B 4440 4444 | B 0044 0004 |

TABLE 8

Enhancement values for horizontal templates based on Pattern 3

| Template Permutations | Example | Enhancement level value of center pixel | |
|---|---|---|---|
| | | Pixel1 | Pixel2 |
| $a_h$ | | B 3221 4444 | W 0000 2100 |
| $b_h$ | | B 0344 0000 | B 4444 1223 |
| $c_h$ | | B 4444 1223 | W 0012 0000 |
| $d_h$ | | B 0000 4430 | B 3221 4444 |
| $e_h$ | | B 4444 3221 | W 2100 0000 |
| $f_h$ | | B 0000 0344 | B 1223 4444 |
| $g_h$ | | B 1223 4444 | W 0000 0012 |
| $h_h$ | | B 4430 0000 | B 4444 3221 |

TABLE 9

Enhancement values for vertical templates based on Pattern 3

| Template Permutations | Example | Enhancement level value of center pixel | |
|---|---|---|---|
| | | Pixel1 | Pixel2 |
| $a_v$ | | B 4444 4443 | B 4440 4400 |
| $b_v$ | | B 0004 0034 | B 0044 0444 |
| $c_v$ | | B 3444 4444 | B 0044 0444 |
| $d_v$ | | B 4300 4000 | B 4440 4400 |
| $e_v$ | | B 4444 3444 | B 0044 0044 |
| $f_v$ | | B 4000 4300 | B 4400 4440 |
| $g_v$ | | B 4443 4444 | B 4400 4440 |
| $h_v$ | | B 0034 0004 | B 0444 0044 |

TABLE 10

Enhancement values for horizontal impulse matches based on Pattern 3

| Template Permutations | Pixel1 | Pixel2 | Pixel3 | Pixel4 |
|---|---|---|---|---|
| $a_h$ black line | W 0000 2100 | B 2344 0000 | B 3221 1223 | |
| $b_h$ white line | W 0000 2100 | B 3221 4444 | B 0344 0000 | B 4444 1223 |
| $c_h$ black line | W 0012 0000 | B 0000 4432 | B 3221 1223 | |
| $d_h$ white line | W 0012 0000 | B 4444 1223 | B 0000 4430 | B 3221 4444 |
| $e_h$ black line | W 2100 0000 | B 0000 2344 | B 1223 3221 | |
| $f_h$ white line | W 2100 0000 | B 4444 | B 0000 | B 1223 |

TABLE 10-continued

Enhancement values for horizontal impulse matches based on Pattern 3

| Template Permutations | Pixel1 | | Pixel2 | | Pixel3 | | Pixel4 |
|---|---|---|---|---|---|---|---|
| white line | | 0000 | | 3221 | | 0344 | 4444 |
| $g_h$ | W | 0000 | B | 4432 | B | 1223 | |
| black line | | 0012 | | 0000 | | 3221 | |
| $h_h$ | W | 0000 | B | 1223 | B | 4430 | B 4444 |
| white line | | 0012 | | 4444 | | 0000 | 3221 |

Example:
Templates $a_h$, $c_h$, $e_h$, $g_h$ black line impulse pair. One white and 2 black pixels have to be corrected for this template.

Templates $b_h$, $d_h$, $f_h$, $h_h$ white line impulse pair. One white and 3 black pixels have to be corrected for this template.

TABLE 11

Enhancement values for vertical impulse matches based on Pattern 3

| Template Permutations | Pixel1 | | Pixel2 | | Pixel3 | | Pixel4 | |
|---|---|---|---|---|---|---|---|---|
| $a_v$ | B | 0004 | B | 0040 | B | | B | |
| black line | | 0330 | | 0400 | | | | |
| $b_v$ | B | 4444 | B | 4440 | B | 0004 | B | 0044 |
| white line | | 4443 | | 4400 | | 0034 | | 0444 |
| $c_v$ | B | 0330 | B | 0040 | B | | B | |
| black line | | 4000 | | 0400 | | | | |
| $d_v$ | B | 3444 | B | 0044 | B | 4300 | B | 4440 |
| white line | | 4444 | | 0444 | | 4000 | | 4400 |
| $e_v$ | B | 4000 | B | 0400 | B | | B | |
| black line | | 0330 | | 0040 | | | | |
| $f_v$ | B | 4444 | B | 0444 | B | 4000 | B | 4400 |
| white line | | 3444 | | 0044 | | 4300 | | 4440 |
| $g_v$ | B | 0330 | B | 0400 | B | | B | |
| black line | | 0004 | | 0040 | | | | |
| $h_v$ | B | 4443 | B | 4400 | B | 0034 | B | 0444 |
| white line | | 4444 | | 4440 | | 0004 | | 0044 |

Examples:
Templates $a_v$, $c_v$, $e_v$, $g_v$ black line impulse pair. Two black pixel have to be corrected for this template.

Templates $b_v$, $d_v$, $f_v$, $h_v$ white line impulse pair. Four black pixels have to be corrected for this template.

TABLE 12

Enhancement values for horizontal templates based on Pattern 4

| Template Permutations | Example | Pixel1 | | Pixel2 | |
|---|---|---|---|---|---|
| $a_h$ | | B | 4332 | W | 0000 |
| | | | 4444 | | 2110 |
| $b_h$ | | B | 2334 | B | 4444 |
| | | | 0000 | | 0112 |
| $c_h$ | | B | 4444 | W | 0112 |
| | | | 2334 | | 0000 |

TABLE 12-continued

Enhancement values for horizontal templates based on Pattern 4

| Template Permutations | Example | Pixel1 | | Pixel2 | |
|---|---|---|---|---|---|
| $d_h$ | | B | 0000 | B | 2110 |
| | | | 4332 | | 4444 |
| $e_h$ | | B | 4444 | W | 2110 |
| | | | 4332 | | 0000 |
| $f_h$ | | B | 0000 | B | 0112 |
| | | | 2334 | | 4444 |
| $g_h$ | | B | 2334 | W | 0000 |
| | | | 4444 | | 0112 |
| $h_h$ | | B | 4332 | B | 4444 |
| | | | 0000 | | 2110 |

TABLE 13

Enhancement values for vertical templates based on Pattern 4

| Template Permutations | Example | Pixel1 | | Pixel2 | |
|---|---|---|---|---|---|
| $a_v$ | $a_v$ | B | 4440 | W | 3000 |
| | | | 4430 | | 0000 |
| $b_v$ | | B | 0003 | B | 0034 |
| | | | 0004 | | 0044 |
| $c_v$ | | B | 0344 | W | 0000 |
| | | | 0444 | | 0003 |
| $d_v$ | | B | 4000 | B | 4400 |
| | | | 3000 | | 4300 |
| $e_v$ | | B | 0444 | W | 0003 |
| | | | 0344 | | 0000 |
| $f_v$ | | B | 3000 | B | 4300 |
| | | | 4000 | | 4400 |
| $g_v$ | $h_v$ | B | 4430 | W | 0000 |
| | | | 4440 | | 3000 |
| $h_v$ | | B | 0004 | B | 0044 |
| | | | 0003 | | 0034 |

TABLE 14

Enhancement values for horizontal impulse matches based on Pattern 4

| Template Permutations | Pixel1 | | Pixel2 | | Pixel3 | | Pixel4 | |
|---|---|---|---|---|---|---|---|---|
| $a_h$ | W | 0000 | B | 2334 | B | 4332 | | |
| black line | | 2110 | | 0000 | | 0112 | | |
| $b_h$ | B | 2334 | B | 4444 | W | 0000 | B | 4332 |
| white line | | 0000 | | 0112 | | 2110 | | 4444 |
| $c_h$ | W | 0112 | B | 0000 | B | 2110 | | |
| black line | | 0000 | | 4332 | | 2334 | | |
| $d_h$ | B | 0000 | B | 2110 | W | 0112 | B | 4444 |
| white line | | 4332 | | 4444 | | 0000 | | 2334 |
| $e_h$ | W | 2110 | B | 0000 | B | 0112 | | |
| black line | | 0000 | | 2334 | | 4332 | | |
| $f_h$ | B | 0000 | B | 0112 | W | 2110 | B | 4444 |

TABLE 14-continued

Enhancement values for horizontal impulse matches based on Pattern 4

| Template Permutations | Pixel1 | | Pixel2 | | Pixel3 | | Pixel4 | |
|---|---|---|---|---|---|---|---|---|
| white line | | 2334 | | 4444 | | 0000 | | 4332 |
| $g_h$ | W | 0000 | B | 4332 | B | 2334 | | |
| black line | | 0112 | | 0000 | | 2110 | | |
| $h_h$ | B | 4332 | B | 4444 | W | 0000 | B | 2344 |
| white line | | 0000 | | 2110 | | 0112 | | 4444 |

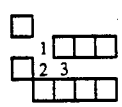

Example:
Templates $a_h$, $c_h$, $e_h$, $g_h$ black line impulse pair
One white and 2 black pixels have to be corrected for this template.

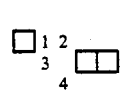

Templates $b_h$, $d_h$, $f_h$, $h_h$ white line impulse pair
One white and 3 black pixels have to be corrected for this template.

TABLE 15

Enhancement values for vertical impulse matches based on Pattern 4

| Template Permutations | Pixel1 | | Pixel2 | | Pixel3 | | Pixel4 | |
|---|---|---|---|---|---|---|---|---|
| $a_v$ | W | 3000 | B | 0003 | B | 0033 | | |
| black line | | 0000 | | 0004 | | 0040 | | |
| $b_v$ | B | 0003 | B | 0034 | W | 3000 | B | 4440 |
| white line | | 0004 | | 0044 | | 0000 | | 4430 |
| $c_v$ | W | 0000 | B | 4000 | B | 0400 | | |
| black line | | 0003 | | 3000 | | 3300 | | |
| $d_v$ | B | 4000 | B | 4400 | W | 0000 | B | 0344 |
| white line | | 3000 | | 4300 | | 0003 | | 0444 |
| $e_v$ | W | 0003 | B | 3000 | B | 3300 | | |
| black line | | 0000 | | 4000 | | 0400 | | |
| $f_v$ | B | 3000 | B | 4300 | W | 0003 | B | 0444 |
| white line | | 4000 | | 4400 | | 0000 | | 0344 |
| $g_v$ | W | 0000 | B | 0004 | B | 0040 | | |
| black line | | 3000 | | 0003 | | 0033 | | |
| $h_v$ | B | 0004 | B | 0044 | W | 0000 | B | 4430 |
| white line | | 0003 | | 0034 | | 3000 | | 4440 |

Example:
Templates $a_v$, $c_v$, $e_v$, $g_v$ black line impulse pair.
One white and 2 black pixels have to be corrected for this template.

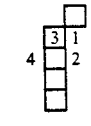

Templates $b_v$, $d_v$, $f_v$, $h_v$ white line impulse pair.
One white and 3 black pixels have to be corrected for this template.

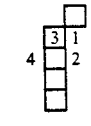

TABLE 16

Enhancement values for horizontal templates based on Pattern 5

| Template Permutations | Example | Pixel1 | | Pixel2 | | Pixel3 | |
|---|---|---|---|---|---|---|---|
| $a_h$ | 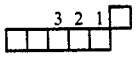 | B | 4433 4444 | B | 3221 4444 | W | 0000 2111 |
| $b_h$ | | B | 2333 0000 | B | 4444 0011 | B | 4444 1223 |
| $c_h$ | | B | 4444 3344 | B | 4444 1223 | W | 1112 0000 |
| $d_h$ | | B | 0000 3332 | B | 1100 4444 | B | 3221 4444 |
| $e_h$ | | B | 4444 4433 | B | 4444 3221 | W | 2111 0000 |
| $f_h$ | | B | 0000 2333 | B | 0011 4444 | B | 1223 4444 |
| $g_h$ | | B | 3344 4444 | B | 1223 4444 | W | 0000 1112 |
| $h_h$ | | B | 3332 0000 | B | 4444 3221 | B | 4444 3221 |

TABLE 17

Enhancement values for vertical templates based on Pattern 5

| Template Permutations | Example | Pixel1 | | Pixel2 | | Pixel3 | |
|---|---|---|---|---|---|---|---|
| $a_v$ | $a_v$ | W | 3000 0000 | B | 4443 4440 | B | 4430 4400 |
| $b_v$ | | B | 0003 0004 | B | 0034 0044 | B | 0344 0444 |
| $c_v$ | | W | 0000 0003 | B | 0444 0344 | B | 0044 0344 |
| $d_v$ | | B | 4000 3000 | B | 4400 4300 | B | 4440 4430 |
| $e_v$ | | W | 0003 0000 | B | 3444 0444 | B | 0344 0044 |
| $f_v$ | | B | 3000 4000 | B | 4300 4400 | B | 4430 4440 |
| $g_v$ | | W | 0000 3000 | B | 4440 4443 | B | 4400 4430 |
| $h_v$ | 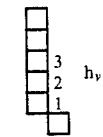 | B | 0004 0003 | B | 0044 0034 | B | 0444 0344 |

TABLE 18

Enhancement values for horizontal impulse matches based on Pattern 5

| Template Permutations | Pixel1 | | Pixel2 | | Pixel3 | | Pixel4 | | Pixel5 | | Pixel6 | |
|---|---|---|---|---|---|---|---|---|---|---|---|---|
| $a_h$ | W | 0000 2111 | B | 2333 0000 | B | 4433 0011 | B | 3221 1223 | | | | |
| black line | | | | | | | | | | | | |
| $b_h$ | W | 0000 2111 | B | 4433 4444 | B | 3221 4444 | B | 2333 0000 | B | 4444 0011 | B | 4444 1223 |
| white line | | | | | | | | | | | | |
| $c_h$ | W | 1112 0000 | B | 0000 3332 | B | 1100 3344 | B | 3221 1223 | | | | |
| black line | | | | | | | | | | | | |
| $d_h$ | W | 0000 1112 | B | 4444 3344 | B | 4444 1223 | B | 0000 3332 | B | 1100 4444 | B | 3221 4444 |
| white line | | | | | | | | | | | | |
| $e_h$ | W | 2111 0000 | B | 0000 2333 | B | 0011 4433 | B | 1223 3221 | | | | |
| black line | | | | | | | | | | | | |
| $f_h$ | W | 2111 0000 | B | 4444 4433 | B | 4444 3221 | B | 0000 2333 | B | 0011 4444 | B | 1223 4444 |
| white line | | | | | | | | | | | | |
| $g_h$ | W | 0000 1112 | B | 3332 0000 | B | 3344 1100 | B | 1223 3221 | | | | |
| black line | | | | | | | | | | | | |

TABLE 18-continued

Enhancement values for horizontal impulse matches based on Pattern 5

| Template Permutations | Pixel1 | | Pixel2 | | Pixel3 | | Pixel4 | | Pixel5 | | Pixel6 | |
|---|---|---|---|---|---|---|---|---|---|---|---|---|
| $h_h$ white line | W | 0000 1112 | B | 4444 3344 | B | 1223 4444 | B | 3332 0000 | B | 4444 1100 | B | 4444 3221 |

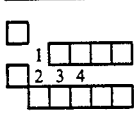

Example:
Templates $a_h$, $c_h$, $e_h$, $g_h$ black line impulse pair.
One white and 3 black pixels have be be corrected for this template.

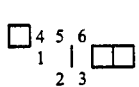

Templates $b_h$, $d_h$, $f_h$, $h_h$ white line impulse pair.
One white and 5 black pixels have to be corrected for this template.

TABLE 19

Enhancement values for vertical impulse matches based on Pattern 5

| Template Permutations | Pixel1 | | Pixel2 | | Pixel3 | | Pixel4 | | Pixel5 | | Pixel6 | |
|---|---|---|---|---|---|---|---|---|---|---|---|---|
| $a_v$ black line | W | 3000 0000 | B | 0033 0040 | B | 0330 0330 | B | 0003 0004 | | | | |
| $b_v$ white line | W | 3000 0000 | B | 4443 4440 | B | 4430 4400 | B | 0003 0004 | B | 0034 0044 | B | 0344 0444 |
| $c_v$ black line | W | 0000 0003 | B | 0400 3300 | B | 0330 0330 | B | 4000 3000 | | | | |
| $d_v$ white line | W | 0000 0003 | B | 0444 3444 | B | 0044 0344 | B | 4000 3000 | B | 4400 4300 | B | 4440 4430 |
| $e_v$ black line | W | 0003 0000 | B | 3300 0400 | B | 0330 0330 | B | 3000 4000 | | | | |
| $f_v$ white line | W | 0003 0000 | B | 3444 0444 | B | 0344 0044 | B | 3000 4000 | B | 4300 4400 | B | 4430 4440 |
| $g_v$ black line | W | 0000 3000 | B | 0040 0033 | B | 0330 0330 | B | 0004 0003 | | | | |
| $h_v$ white line | W | 0000 3000 | B | 4440 4443 | B | 4400 4430 | B | 0004 0003 | B | 0044 0034 | B | 0444 0344 |

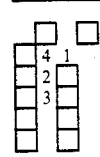

Example:
Templates $a_v$, $c_v$, $e_v$, $g_v$ black line impulse pair.
One white and 3 black pixels have to be corrected for this template.

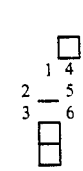

Templates $b_v$, $d_v$, $f_v$, $h_v$ white line impulse pair.
One white and 5 black pixels have to be corrected for this template.

TABLE 20

Enhancement values for horizontal templates based on Pattern 6

| Template Permutations | Example | Pixel1 | | Pixel2 | | Pixel3 | |
|---|---|---|---|---|---|---|---|
| $a_h$ | 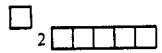 | B | 3322 4444 | W | 0000 2211 | | |
| $b_h$ | | B | 2233 0000 | B | 3444 0001 | B | 4444 1122 |
| $c_h$ | | B | 4444 2233 | W | 1122 0000 | | |
| $d_h$ | | B | 0000 3322 | B | 1000 4443 | B | 2211 4444 |
| $e_h$ | | B | 4444 3322 | W | 2211 0000 | | |
| $f_h$ | | B | 0000 2233 | B | 0001 3444 | B | 1122 4444 |
| $g_h$ | | B | 2233 4444 | W | 0000 1122 | | |
| $h_h$ | 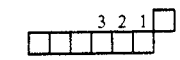 | B | 3322 0000 | B | 4443 1000 | B | 4444 2211 |

TABLE 21

Enhancement values for vertical templates based on Pattern 6

| Template Permutations | Example | Pixel1 | | Pixel2 | | Pixel3 | |
|---|---|---|---|---|---|---|---|
| $a_v$ | 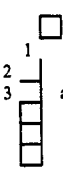 | W | 3000 0000 | B | 4443 4443 | B | 4440 4430 |
| $b_v$ | | B | 0003 0004 | B | 0034 0034 | B | 0044 0344 |
| $c_v$ | 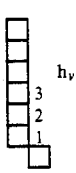 $a_v$ | W | 0000 0003 | B | 3444 3444 | B | 0344 0444 |
| $d_v$ | | B | 4000 3000 | B | 4300 4300 | B | 4430 4400 |
| $e_v$ | | W | 0003 0000 | B | 3444 3444 | B | 0444 0344 |
| $f_v$ | | B | 3000 4000 | B | 4300 4300 | B | 4400 4430 |
| $g_v$ | $h_v$ | W | 0000 3000 | B | 4443 4443 | B | 4430 4440 |
| $h_v$ | | B | 0004 0003 | B | 0034 0034 | B | 0344 0044 |

TABLE 22

Enhancement values for horizontal impulse matches based on Pattern 6

| Template Permutations | Pixel1 | | Pixel2 | | Pixel3 | | Pixel4 | | Pixel5 | |
|---|---|---|---|---|---|---|---|---|---|---|
| $c_h$ black line | W | 1122 0000 | B | 0000 3322 | B | 0000 4444 | B | 2211 2233 | | |
| $d_h$ white line | W | 1122 0000 | B | 4444 2233 | B | 0000 3322 | B | 1000 4443 | B | 2211 4444 |
| $e_h$ black line | W | 2211 0000 | B | 0000 2233 | B | 0000 4444 | B | 1222 3322 | | |
| $f_h$ white line | W | 2211 0000 | B | 4444 3322 | B | 0000 2233 | B | 0001 3444 | B | 1122 4444 |
| $g_h$ black line | W | 0000 1122 | B | 3322 0000 | B | 4444 0000 | B | 2333 2211 | | |
| $h_h$ white line | W | 0000 1122 | B | 2233 4444 | B | 3322 0000 | B | 4443 1000 | B | 4444 2211 |

Example:
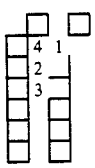
Templates $a_h$, $c_h$, $e_h$, $g_h$ black line impulse pair. One white and 3 black pixels have to be corrected for this template.

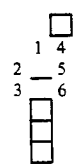
Templates $b_h$, $d_h$, $f_h$, $h_h$ white line impulse pair. One white and 4 black pixels have to be corrected for this template.

TABLE 23

Enhancement values for vertical impulse matches based on Pattern 6

| Template Permutations | Pixel1 | | Pixel2 | | Pixel3 | | Pixel4 | | Pixel5 | | Pixel6 | |
|---|---|---|---|---|---|---|---|---|---|---|---|---|
| $a_v$ black line | W | 3000 0000 | B | 0033 0033 | B | 0040 0330 | B | 0003 0004 | | | | |
| $b_v$ white line | W | 3000 0000 | B | 4443 4443 | B | 4440 4430 | B | 0003 0004 | B | 0034 0034 | B | 0044 0344 |
| $c_v$ black line | W | 0000 0003 | B | 3300 3300 | B | 0330 0400 | B | 4000 3000 | | | | |
| $d_v$ white line | W | 0000 0003 | B | 3444 3444 | B | 0344 0444 | B | 4000 3000 | B | 4300 4300 | B | 4430 4400 |
| $e_v$ black line | W | 0003 0000 | B | 3300 3300 | B | 0400 0330 | B | 3000 4000 | | | | |
| $f_v$ white line | W | 0003 0000 | B | 3444 3444 | B | 0444 0344 | B | 3000 4000 | B | 4300 4300 | B | 4400 4430 |
| $g_v$ black line | W | 0000 3000 | B | 0033 0033 | B | 0330 0040 | B | 0004 0003 | | | | |
| $h_v$ white line | W | 0000 3000 | B | 4443 4443 | B | 4430 4440 | B | 0004 0003 | B | 0034 0034 | B | 0344 0044 |

Templates $a_v$, $c_v$, $e_v$, $g_v$ black line impulse pair.
One white and 3 black pixels have to be corrected for this template.

Templates $b_v$, $d_v$, $f_v$, $h_v$ white line impulse pair.
One white and 5 black pixels have to be corrected for this template.

Enhancement values for horizontal impulse matches based on Pattern 6

| Template Permutations | Pixel1 | | Pixel2 | | Pixel3 | | Pixel4 | | Pixel5 | |
|---|---|---|---|---|---|---|---|---|---|---|
| $a_h$ black line | W | 0000 2211 | B | 2233 0000 | B | 4444 0000 | B | 3322 1122 | | |
| $b_h$ white line | W | 0000 2211 | B | 3322 4444 | B | 2233 0000 | B | 3444 0001 | B | 4444 1122 |

What is claimed is:

1. A method of enhancing the contour fidelity of reproduction of an image represented by a plurality of pixels, comprising the steps of:
   storing a portion of pixels representing an image portion in a first storage;

isolating a region of the pixels of said image portion to form a window including a central pixel and a formation of pixels surrounding said central pixel;

comparing a group of pixels encompassing pixels surrounding said central pixel and within said window with a hierarchical set of standard pixel patterns, said hierarchical set comprising:

a set of pixel patterns in which each next higher member in said hierarchial set is a composite of the previous member and an extension pattern of additional bits, said extension pattern comprising at least a pixel that is on and a pixel that is off, wherein a match of any pattern also matches all patterns lower in the hierarchy; and each of said pixel patterns including particular correctable pixel positions, said particular correctable pixel positions for each pattern being based upon the contour angle represented by that pattern;

indentifying matching pixel patterns; and enhancing said central pixel if said central pixel is located at a particular correctable position in the highest priority pattern matched in said hierarchical set.

2. The method of claim 1 in which the comparing step comprises comparing said group of pixels with a set of templates representing contours at different angles, said templates being arranged in a hierarchical order.

3. The method of claim 1 wherein the step of isolating said window comprises forming a matrix of M number of consecutive pixels in N number of consecutive lines to form a M×N window defining a region of the image, where M is at least one pixel greater that the maximum run length of the highest priority pattern in said hierarchical pattern set, and N is at least the maximum height of the highest priority pattern in said hierarchical pattern set, the window having a central pixel at the center of the matrix.

4. The method of claim 1 wherein said window comprises said central pixel and a symmetrical formation of pixels surrounding said central pixel.

5. The method of claim 1 wherein the step of enhancing said central pixel includes making multiple scan passes at a line containing said central pixel, scanning taking place in a fast scan direction and sequential scan passes taking place in a process direction, to provide an expanded segment pattern representing said central pixel.

6. The method of claim 5 wherein a first scan pass produces a plurality of segments representing a top portion of said central pixel, and a second pass produces a plurality of segments representing a bottom portion of said central pixel, each segment having a multi-bit value representing a gray level according to the enhancement pattern for said oentral pixel.

7. The method of claim 1 wherein the step of identifying matching patterns includes the step of generating unique identifying signals in accordance with the particular match determined.

8. The method of claim 7 wherein the step of identifying matching pixel patterns includes the step of producing a default identifying signal in response to finding no match in the hierarchical set.

9. The method of claim 8 wherein the step of enhancing said central pixel includes reproducing the value of said central pixel with no enhancement in response to said default identifying signal.

10. The method of claim 1 including the step of forming a window for each image pixel, each image pixel being the central pixel for at least one window.

11. The method of claim 1 in which said hierarchical set of standard pixel patterns comprises:

a first pattern comprising a first pixel that is on, and a second pixel that is off; and an nth pattern comprising a combination of an $(n-1)$th pattern plus an extension pattern comprising a pixel that is on and a pixel that is off.

12. The method of claim 1 in which said hierarchical set of standard pixel patterns comprises:

a first pattern comprising at least a first instance of said extension pattern of pixels;

an nth pattern comprising a combination of an $(n-1)$th pattern and an nth instance of said extension pattern of pixels.

13. A method for enhancing the contour fidelity of reproduction of an image represented by a plurality of signals on a microaddressable display system, comprising the steps of:

storing a portion of the signals representing an image portion;

isolating a region of the signals of said image portion to form a window including a central signal and a formation of signals surrounding said central signal;

comparing a group of signals encompassing said central signal and within said window with a set of standard signal patterns, each of said patterns having particular correctable signal locations, said correctable signal locations based upon the contour represented by the pattern;

identifying matching signal patterns; and enhancing said central signal with enhancement data from a look-up table corresponding to the matching pattern in said set of patterns if said central signal is located in a correctable location in said matching pattern.

14. The method of claim 13 in which said set of standard signal patterns comprises a hierarchical set of templates representing contours at different angles in which each higher member template in the set is a composite of the previous member and an extension pattern of additional signals, wherein a match of any pattern also matches all patterns lower in the hierarchy, said templates being arranged in a hierarchical order according to angle.

15. The method of claim 13 wherein the step of isolating said window comprises forming a matrix of M number of consecutive signals in N number of consecutive lines to form a M×N window defining a region of the image,, where M is at least one pixel greater that the maximum run length of the highest priority pattern in the hierarchical pattern set, and N is at least the maximum height of the highest priority pattern in the hierarchical pattern set, the window having the central signal at the center of the matrix.

16. The method of claim 13 wherein the step of comparing includes the step of comparing signals in said window with signal patterns of a set of standard signal formats to determine equivalence to at least one of the patterns; and the step of identifying matching patterns includes the step of generating unique identifying signals in accordance with the particular equivalence determined.

17. The method of claim 16 wherein the step of enhancing the central signal includes the step of producing a default identifying signal in response to finding no match in the set of standard signal pattern.

18. The method of claim 13 including the step of forming a window for each image signal, each image signal being the central signal for at least one window.

19. The method of claim 14 in which said set of standard signal patterns comprises:
   a first pattern comprising at least a first instance of an extension pattern of signals;
   an nth pattern comprising a combination of an (n−1)th pattern and an nth instance of said extension pattern of signals.

20. The method of claim 13 wherein said enhancement data is based on differing scan spot width at differing levels of intensity.

21. A microaddressable display system for enhancing the contour fidelity of reproductions of an image represented by a plurality of pixels, comprising:
   means for receiving pixels of the image, said pixels representing at least portions of successive scan lines of the image;
   first memory means for storing a portion of said pixels;
   means for isolating a region of said pixels to form a composite pixel pattern;
   a source of hierarchical standard pixel patterns, said patterns arranged such that each next higher member in said hierarchical set is a composite of the previous member and an extension pattern of additional pixels, wherein a match of any pattern also matches all patterns lower in the hierarchy;
   means for comparing said composite pixel pattern with said hierarchical standard pixel patterns;
   logic means responsive to the comparison for producing signals representative of the comparison; and
   enhancing means responsive to said logic signals to produce enhanced values for each pixel of the image according to the highest priority pattern matched in said hierarchical standard pixel patterns.

22. The method of claim 7 wherein the step of identifying matching patterns includes the step of producing a default identifying signal in response to finding a match in the hierarchical set when the central pixel is not in a particular correctable position.

* * * * *